US012704874B2

(12) United States Patent
Lee et al.

(10) Patent No.: US 12,704,874 B2
(45) Date of Patent: Aug. 11, 2026

(54) DISPLAY DEVICE AND CONTROL METHOD THEREOF

(71) Applicant: LG ELECTRONICS INC., Seoul (KR)

(72) Inventors: Jinhee Lee, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 18/708,378

(22) PCT Filed: Nov. 10, 2021

(86) PCT No.: PCT/KR2021/016328
§ 371 (c)(1),
(2) Date: May 8, 2024

(87) PCT Pub. No.: WO2023/085452
PCT Pub. Date: May 19, 2023

(65) Prior Publication Data
US 2025/0004498 A1 Jan. 2, 2025

(51) Int. Cl.
*G06F 1/16* (2006.01)
*G06F 3/04817* (2022.01)
(Continued)

(52) U.S. Cl.
CPC ........ *G06F 1/1601* (2013.01); *G06F 3/04817* (2013.01); *G06F 3/0482* (2013.01); (Continued)

(58) Field of Classification Search
CPC ......... H04N 21/42206; H04N 21/4858; H04N 21/462; H04N 21/4316; H04N 21/431; (Continued)

(56) References Cited

U.S. PATENT DOCUMENTS 9,383,775 B2 * 7/2016 Cho ........................ G09F 9/301
9,639,177 B2 * 5/2017 Kim ...................... G06F 3/1431
(Continued)

FOREIGN PATENT DOCUMENTS

JP 2014-160469 9/2014
KR 10-2015-0083445 7/2015
(Continued)

OTHER PUBLICATIONS

PCT International Application No. PCT/KR2021/016328, International Search Report dated Aug. 3, 2022, 9 pages.
(Continued)

*Primary Examiner* — Vinh T Lam
(74) *Attorney, Agent, or Firm* — LEE, HONG, DEGERMAN, KANG & WAIMEY

(57) ABSTRACT

An embodiment of the present disclosure provides a display device comprising: a communication unit for communicating with the outside; a display including a display area for outputting contents; a motor for controlling the display so that a partial area of the display area is exposed to the outside; and a controller for controlling the communication unit, the display, and the motor, wherein the controller performs control to output a first content on a first partial view in a state in which the display is the first partial view, changes the display to a second partial view when an event occurrence is received, and performs control to output a second content on the second partial view, wherein the second partial view has a display area which is exposed to the outside and is larger than that of the first partial view.

14 Claims, 23 Drawing Sheets

(51) Int. Cl.
*G06F 3/0482* (2013.01)
*H04N 21/431* (2011.01)
*H04N 21/462* (2011.01)
*H04N 21/485* (2011.01)

(52) U.S. Cl.
CPC ....... *H04N 21/4314* (2013.01); *H04N 21/462* (2013.01); *H04N 21/4858* (2013.01)

(58) Field of Classification Search
CPC ............... H04N 21/814; H04N 21/482; H04N 21/4312; H04N 21/4314; G09G 5/391; G09G 5/38; G09G 2354/00; G09G 2340/04; G09G 2340/14; G09G 2380/02; G09G 2300/04; G06F 3/0482; G06F 1/1601; G06F 3/04817
See application file for complete search history.

(56) References Cited

U.S. PATENT DOCUMENTS 10,201,103 B2 * 2/2019 Kim ...................... B65H 16/06
10,203,863 B2 * 2/2019 Kwon .................. G06F 1/1652
10,241,542 B2 * 3/2019 Kwak ................ H04M 1/0268
10,362,690 B2 * 7/2019 Han ...................... G09F 9/301
10,390,443 B2 * 8/2019 Kim ...................... B21B 39/008
10,506,726 B2 * 12/2019 Kang .................. H10K 77/111
11,262,803 B2 * 3/2022 Pyo ...................... G06F 1/1652
11,272,626 B2 * 3/2022 Lee ...................... G06F 1/1601
11,348,490 B1 * 5/2022 Kwak ................ H04M 1/0237
11,491,875 B2 * 11/2022 Kang .................... B60K 35/50
11,539,775 B2 * 12/2022 Kye ........................ G06F 3/14
11,600,211 B2 * 3/2023 Kim ...................... G09G 3/035
11,617,276 B2 * 3/2023 Song ..................... B60K 35/60
362/489
11,626,041 B2 * 4/2023 Park ...................... G09F 9/301
361/679.01
11,635,882 B2 * 4/2023 Noh ...................... G06F 3/0486
715/808
11,670,199 B2 * 6/2023 Kang .................... G06F 1/1652
361/679.01
11,699,414 B2 * 7/2023 Lee ........................ G09G 5/14
345/173
11,709,594 B2 * 7/2023 Noh ...................... G06F 1/1652
345/173
11,741,869 B2 * 8/2023 Kwon ..................... G06F 3/041
345/173
11,749,151 B2 * 9/2023 Woo .................... G06F 3/04847
345/661
11,776,440 B2 * 10/2023 Kim ...................... G06F 3/0481
345/212
11,798,488 B2 * 10/2023 Jung .................... G09G 3/3275
11,837,112 B2 * 12/2023 Yoshizumi ............. H04N 7/183
11,862,078 B2 * 1/2024 Park ...................... G06F 1/1601
11,968,318 B2 * 4/2024 Choi .................... H04N 23/632
12,032,410 B2 * 7/2024 Chen ................ H04N 21/42684
12,055,981 B2 * 8/2024 Choi ..................... G06F 1/1681
12,061,785 B2 * 8/2024 Lee ...................... G06F 1/1652
12,069,820 B2 * 8/2024 Park ........................ G09F 9/301
12,081,691 B2 * 9/2024 Kim .................... H04M 1/0268
12,101,897 B2 * 9/2024 Pyo ......................... G09F 9/301
12,165,548 B2 * 12/2024 Kim ........................ G09F 9/301
12,192,399 B2 * 1/2025 Kim .................... H04M 1/0237
12,216,501 B2 * 2/2025 Wang .................... G06F 1/1675
12,307,934 B2 * 5/2025 Kim ...................... G06F 1/1624
12,425,510 B2 * 9/2025 Kim .................... G06F 3/04886
2006/0082518 A1 * 4/2006 Ram ..................... G06F 1/1675
345/1.1
2009/0102744 A1 * 4/2009 Ram ..................... G06F 1/1679
345/1.1
2012/0223872 A1 * 9/2012 Ram ..................... G06F 1/1662
345/1.3
2015/0212546 A1 * 7/2015 Ram ....................... G06F 1/162
361/679.01
2016/0124466 A1 * 5/2016 Ram ..................... G06F 1/1616
361/679.26
2016/0306534 A1 * 10/2016 Woo .................... G06F 3/04847
2016/0320797 A1 * 11/2016 Ram ..................... G06F 1/1679
2017/0255232 A1 * 9/2017 Ram ..................... G06F 1/1681
2018/0088630 A1 * 3/2018 Ram ..................... G06F 1/1666
2018/0275717 A1 * 9/2018 Ram ..................... G06F 3/1446
2018/0301124 A1 10/2018 Oh et al.
2019/0261519 A1 * 8/2019 Park .................... H04M 1/0235
2020/0163238 A1 * 5/2020 Kim ..................... H05K 5/0247
2020/0201394 A1 * 6/2020 Choi ....................... G09F 9/301
2021/0004056 A1 * 1/2021 Kim ........................ G09F 9/301
2021/0182008 A1 6/2021 Kim
2021/0201726 A1 * 7/2021 Kim ....................... G09G 3/035
2021/0278879 A1 9/2021 Choi et al.
2021/0333991 A1 * 10/2021 Kim .................... G06F 3/04817
2021/0366441 A1 * 11/2021 Hong ....................... G09G 5/38
2022/0113842 A1 * 4/2022 Kim ...................... G06F 1/1624
2022/0121346 A1 * 4/2022 Kim ...................... G06F 1/1624
2022/0148475 A1 * 5/2022 Park ...................... G06F 1/1652
2022/0365562 A1 * 11/2022 Ahn ...................... G06F 1/1624
2023/0036884 A1 * 2/2023 Kwon ................ H04N 21/4854
2023/0040472 A1 * 2/2023 Kim ...................... G06F 1/1624
2023/0305670 A1 * 9/2023 Kim ........................ G06F 1/163
2023/0308532 A1 * 9/2023 Kim ...................... G06F 1/1677
2025/0046222 A1 * 2/2025 Do ..................... H04N 21/4316

FOREIGN PATENT DOCUMENTS

KR 10-2017-0017202 2/2017
KR 10-2020-0136256 12/2020
KR 10-2021-0102163 8/2021
KR 10-2021-0119283 10/2021
WO 2016-185814 11/2016

OTHER PUBLICATIONS

European Patent Office Application Serial No. 21964162.8, Search Report dated Dec. 2, 2024, 10 pages.
Korean Intellectual Property Office Application No. 10-2024-7018266, Office Action dated Dec. 1, 2025, 5 pages.

* cited by examiner (a)

Coronavirus
Search
1301
1302
100
(a)
Search results for coronavirus
New COVID-19 cases until 9 PM...
1303
1304
100
(b)
There have been 1,657 new confirmations of COVID-19 as of 9 p.m. Around 1,800 people today
Input 2021-08-18 00:07 | Edit 2021-08-18 00:07
1305
100
(c)

1804
1803
100

1901
1902
100

1903

1904

100

DISPLAY DEVICE AND CONTROL METHOD THEREOF

CROSS-REFERENCE TO RELATED APPLICATION(S)

This application is the National Stage filing under 35 U.S.C. 371 of International Application No. PCT/KR2021/016328, filed on Nov. 10, 2021, the contents of which is hereby incorporated by reference herein in its entirety.

TECHNICAL FIELD

The technical field of the present disclosure is a variety of multimedia devices with a display. More particularly, the present disclosure relates to a display device in which the size of an exposed display area is varied.

BACKGROUND

A display device is a device having a function of receiving, processing, and displaying an image to be viewed by a user. For example, the display device receives a broadcast selected by the user from among broadcast signals transmitted from a broadcasting station, separates an image signal from the received signal, and displays the separated image signal on the display.

Recently, due to the development of broadcasting technologies and network technologies, the functions of the display device have been significantly diversified, and the performance of the device has been improved accordingly. That is, the display device has been developed to provide not only content to be broadcast but also other various contents to the user. For example, the display device may provide game play, music appreciation, internet shopping, user customized information, and the like using various applications as well as programs received from a broadcasting station. To perform such an extended function, the display device may basically be connected to other devices or networks by using various communication protocols, and may provide a user with a ubiquitous computing environment. That is, the display device is advanced to a smart device that enables connectivity and commercial computing to the network.

In the display device according to the related art, all regions of the display are always exposed. However, when a black screen is always exposed even when a user does not watch the display device, the user is not capable of sufficiently utilizing a space.

There are no developed embodiments that vary the size of a display area exposed to the outside based on information received by a display device when the display device moves a cover or display using a motor to output images or videos in the entirety or part of the display area.

To resolve such a problem, research on a new form factor of a display device has been actively conducted.

DISCLOSURE

Technical Problem

An embodiment of the present disclosure is to provide a system for selectively exposing a partial region or an entire region of a display area to the outside by using a motor added to a display device.

Another embodiment of the present disclosure is to specifically define content displayed in the entirety or part of a display area to minimize power consumption of a motor added to a display device. Since motor operation is expected to consume more power than conventional display devices, defining specific content displayed in a specific mode is a crucial technology.

A further embodiment of the present disclosure is to provide a display device for automatically changing the size of a display area exposed to the outside when the display device receives an event occurrence or control signal.

Technical Solution

In an aspect of the present disclosure, provided herein is a display device. The display device includes: a communication module configured to communicate externally; a display having a display area for outputting content; a motor configured to control the display to expose a portion of the display area externally; and a controller configured to control the communication module, the display, and the motor. The controller is configured to: control the display to output first content on the first partial view based on that a state of the display is the first partial view; change the state of the display to a second partial view based on receiving an event occurrence; and control the display to output second content on the second partial view. The second partial view has a larger display area exposed externally than the first partial view.

The first content is an icon list including at least one icon. The event occurrence is a control signal for selecting a first icon from the icon list. The second content is a detailed menu for the first icon.

Based on receiving a control signal for the detailed menu, the controller is configured to change the state of the display to a full view and output content for the detailed menu on the full view.

The first content is a text search screen. The event occurrence is a control signal for selecting a search icon. The second content is a list of search results.

Based on receiving a control signal for selecting a first search result from the list of search results, the controller is configured to change the state of the display to a full view and output content for the first search result on the full view.

Based on receiving an additional event occurrence, the controller is configured to change the state of the display to a third partial view and control the display to output content related to the additional event occurrence on the third partial view. The third partial view has a larger display area exposed externally than the second partial view.

The first content is default content, and the event occurrence is an emergency alarm.

The controller is configured to change the state of the display to a full view, where the full view is a state in which the display area is maximally exposed externally. Based on that the state of the display is the full view, the controller is configured to output additional information in a predetermined area.

The controller is configured to determine the predetermined area in which the additional information is output based on content being output on the full view.

The controller is configured to: establish a connection with an external terminal through the communication module; and change the state of the display to one of the first partial view and the second partial view based on information received from the external terminal.

Based on that the information received from the external terminal includes an image or video, the controller is configured to: change the state of the display to the second partial view; and output a thumbnail for the image or video on the second partial view.

Based on receiving a control signal for the thumbnail, the controller is configured to: change the state of the display to a full view; and output entire content for the thumbnail on the full view.

The controller is configured to: receive information on a screen of the external terminal; and control the display to expose a portion of the display area externally based on the received screen information.

The controller is configured to: receive content being output by the external terminal; and output the received content in the portion of the display area through mirroring.

In another aspect of the present disclosure, provided herein is a method of controlling a display device configured to change a size of a display area exposed externally. The method includes: outputting first content on a first partial view based on that a state of a display is the first partial view; changing the state of the display to a second partial view based on receiving an event occurrence; and outputting second content on the second partial view. The second partial view has a larger display area exposed externally than the first partial view.

Advantageous Effects

An embodiment of the present disclosure provides a display device and a method of controlling the display device, for selectively exposing a partial region or an entire region of a display area of a display by using a motor added to a display device.

According to another embodiment of the present disclosure, the size of a portion of a display area exposed to the outside may vary depending on the situation.

According to a further embodiment of the present disclosure, if a display device receives user interaction or additional alarms while a portion of a display area of the display device is exposed to the outside, the display device may control the size of the portion of the display area exposed to the outside, thereby allowing users to view desired content in smaller or larger areas without directly manipulating a display.

BRIEF DESCRIPTION OF THE DRAWINGS

FIG. 9 is a diagram showing a front surface illustrating a state in which a front cover of a display device is removed, according to an embodiment of the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions, or steps, disclosed in the specification, and it is also understood that greater or fewer components, functions, or steps may likewise be utilized.

Figure 1:
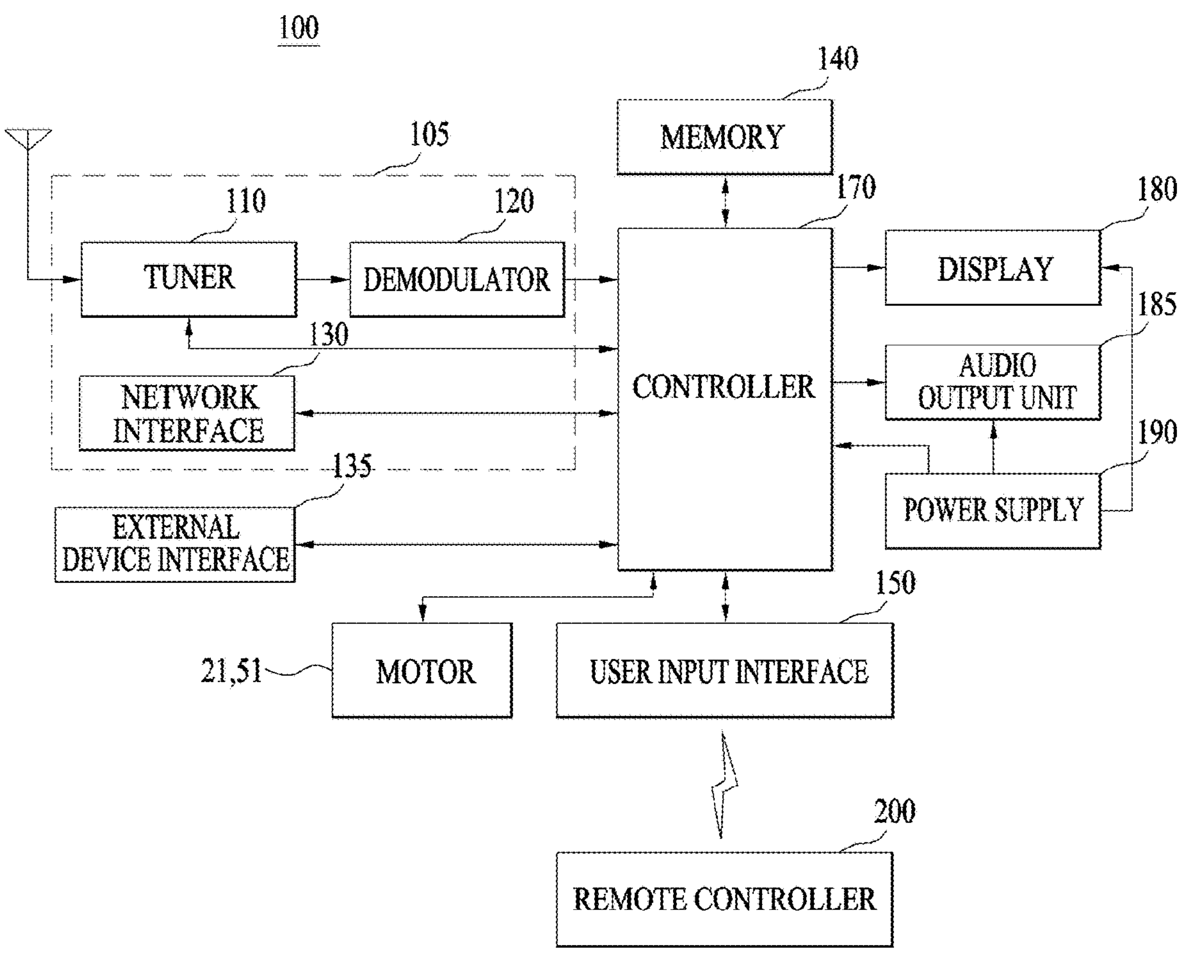
FIG. 1 is a diagram illustrating components in a display device according to an embodiment of the present disclosure.

FIG. 1 is a diagram illustrating components in a display device according to an embodiment of the present disclosure.

Referring to FIG. 1, a display device 100 may include a broadcast receiver 105, an external device interface 135, a memory 140, a user input interface 150, a controller 170, a display 180, an audio output unit 185, and a power supply 190. The components illustrated in FIG. 1 are not indispensable for implementing the display device 100, and thus the device 100 described in the specification may have more or fewer components than those listed above.

The aforementioned components are not shown in detail in the accompanying drawings, and only some important components may be illustrated in the accompanying drawings. However, although not all shown, one of ordinary skill in the art will appreciate that at least the components of FIG. 1 may be included in the display device 100 to implement functionality as a display device.

The broadcasting receiver 105 may include a tuner 110, a demodulator 120 and a network interface 130. As needed, the broadcasting receiver 105 may be configured to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal. More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170. The tuner 110 may be capable of receiving RF broadcast signals from an Advanced Television Systems Committee (ATSC) single-carrier system or from a Digital Video Broadcasting (DVB) multi-carrier system. The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving, and Reed-Solomon decoding. For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload. In order to properly handle not only ATSC signals but also DVB signals, the demodulator 120 may include an ATSC demodulator and a DVB demodulator. The TS output from the demodulator 120 may be input to the controller 170 and thus subjected to demultiplexing and A/V signal processing. The processed video and audio signals are output to the display 180 and the audio output unit 185, respectively.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA). The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100. The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VOD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network. In an aspect of this disclosure, when a game application is executed in the image display device, the network interface 130 may transmit data to or receive data from a user terminal connected to the image display device through a network. In addition, the network interface 130 may transmit specific data to or receive specific data from a server that records game scores.

The external device interface 135 may serve as an interface between an external device and the image display device 100. For interfacing, the external device interface 135 may include an A/V Input/Output (I/O) unit (not shown) and/or a wireless communication module (not shown). The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video, and data signals from or to the external device, the external device interface 135 includes the A/V I/O unit (not shown) and/or the wireless communication module (not shown). The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100. The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards. The external device interface 135 may be connected to various set-top boxes through at least one of the above-described ports and may thus perform an I/O operation with the various set-top boxes. The external device interface 135 may receive applications or an application list from an adjacent external device and provide the applications or the application list to the controller 170 or the memory 140.

The external device interface 135 may establish a communication network with various remote controllers 200, receive a control signal related to an operation of the display device 100 from the remote controller 200, or transmit data related to the operation of the display device 100 to the remote controller 200.

The memory 140 may store various programs necessary for the controller 170 to process and control signals, and may also store processed video, audio, and data signals. For example, the memory 140 may store application programs designed to perform various tasks to be processed by the controller 170, and may selectively provide some of the stored application programs when the controller 170 requests.

Programs stored in the memory 140 is not particularly limited as long as the programs may be executed by the controller 170. The memory 140 may temporarily store an image, a voice, or a data signal received from an external device through the network interface 130. The memory 140 may store information about a certain broadcast channel through a channel memory function such as a channel map.

The memory 140 may include at least one of a volatile memory (e.g., DRAM, SRAM, and SDRAM) or a non-volatile memory (e.g., a flash memory, a hard disk drive (HDD), and a solid state drive (SSD)).

While the memory 140 is shown in FIG. 1 as configured separately from the controller 170, to which this disclosure is not limited, the memory 140 may be incorporated into the controller 170, for example.

The user input interface 150 transmits a signal received from the user to the controller 170 or transmits a signal received from the controller 170 to the user. For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication. For example, the user input interface 150 may provide the controller 170 with control signals received from local keys (not shown), such as inputs of a power key, a channel key, and a volume key, and setting values. Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 typically controls the overall operation of the display device 100. The controller 170 may provide or process information or functions appropriate for a user by processing signals, data, information, and the like, which are input or output through all components illustrated in FIG. 1, or driving an application program stored in the device 100. Although not shown, the device 100 may include a substrate therein. The substrate may be a component mounted together with various electronic components, particularly, other circuits and devices that assist the various electronic components, and may be installed in a housing 10. Although not shown in detail, each of the components illustrated in FIG. 1 may be directly installed on the substrate to be controlled by the controller 170, or may be installed in the housing 10 to be electrically connected to the substrate. Accordingly, the controller 170 may be referred to as various names such as a controller and a controlling device, and may control the display device 100 and all components thereof. Accordingly, all operations and controls included in the detailed description of the present application may be considered as features of the controller 170.

The controller 170 may demultiplex the TS received from the tuner 110, the demodulator 120, or the external device interface 135 into a number of signals and process the demultiplexed signals into audio and video data. The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135. While not shown in FIG. 1, the controller 170 may include a DEMUX and a video processor.

The controller 170 may provide overall control to the image display device 100. For example, the controller 170 may control the tuner 110 to tune to an RF broadcast signal corresponding to a user-selected channel or a pre-stored channel. The controller 170 may control the image display device 100 according to a user command received through the user input interface 150 or according to an internal program. Especially the controller 170 may access a network and download an application or application list selected by the user to the image display device 100 over the network. For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185. As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture. The controller 170 may control content playback. The content may include any content stored in the image display device 100, received broadcast content, and externally input content. The content includes at least one of a broadcast image, an externally input image, an audio file, a still image, a Web page, or a text file.

If an application view menu item is selected, the controller 170 may control display of applications or a list of applications that are present in the image display device 100 or downloadable from an external network. The controller 170 may control installation and execution of an application downloaded from the external network along with various UIs. Also, the controller 170 may control display of an image related to the executed application on the display 180, upon user selection.

The controller 170 may perform control to search for a user terminal network-connected to an image display device through the network interface 130, output the searched list of user terminals through the display 180, and receive a selection signal of a user terminal used as a user controller from the list of the searched user terminals through the user interface 150.

The controller 170 may control the motors 21 and 51, and may also control the aforementioned operations of a roller 20, a cover 40 and a supporter 50 according to the control. The controller 170 may control expansion and contraction of the display 30 based on information related to deformation of a flexible display 30, sensed by a deformation sensor. That is, the controller 170 may control the motors 21 and 51, the roller 20, the cover 40, and the supporter 50 to expand and contract the display 30 according to the sensed information. The controller 170 may sense the size of an actual screen formed according to the winding or unwinding of the display 30 according to the information sensed by the size sensor. More specifically, the controller 170 may display information only on a screen of the display 30 actually exposed to the outside of the housing 10 by using the information of the size sensor. The controller 170 may turn off a portion of the display 30 hidden inside the housing 10. According to this control, the controller 170 may effectively reduce power consumption, and similarly, may effectively reduce heat generation.

To sense a gesture or movement of the user, as described above, a sensing unit (not shown) having at least one of a touch sensor, a voice sensor, a position sensor, and an operation sensor may be further provided in the display device 100. The sensing unit may include a camera to directly identify the movement of the user or another camera included in the home. The signal sensed by the sensing unit (not shown) may be transmitted to the controller 170, and the controller 170 may recognize a command by a gesture of the user by using the signal. The controller 170 may check whether the user approaches the display device 100 or whether the user is present at the home.

The display 180 may generate a driving signal by converting an image signal, a data signal, an on screen display (OSD) signal, and a control signal, which is processed by the controller 170, or an image signal, a data signal, and a control signal, which are received from the network interface 130. The display 180 may include a display panel including a plurality of pixels. The plurality of pixels included in the display panel may include subpixels of RGB. Alternatively, the plurality of pixels included in the display panel may include subpixels of RGBW. The display 180 may convert an image signal, a data signal, an OSD signal, and a control signal, which are processed by the controller 170, to generate a driving signal for the plurality of pixels.

The display 180 may be various types of displays such as a Plasma Display Panel (PDP), a Liquid Crystal Display (LCD), an Organic Light-Emitting Diode (OLED) display, a flexible display, and a 3D display. The 3D display 180 may be classified into glasses-free and glasses-based types.

The display 180 may also be a touchscreen that can be used not only as an output device but also as an input device.

The audio output unit 185 may receive a processed audio signal (e.g., a stereo signal, a 3.1-channel signal, or a 5.1-channel signal) from the controller 170 and output the received audio signal as sound. The audio output unit 185 may employ various speaker configurations.

The power supply 190 supplies power to the image display device 100. Particularly, the power supply 190 may supply power to the controller 170 which may be implemented as a System On Chip (SOC), the display 180 for displaying an image, and the audio output unit 185 for audio output. The power supply 190 may provide power to related components including the controller 170 to automatically start the operation of the display device according to an external command and a preset condition. For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The power supply 190 receives power from the outside and distributes the power to each component. The plurality of displays 180 may include a first power supply (not shown) to supply power for driving each display panel. A second power supply (not shown) to supply power to the first power supply may be provided in a main body frame (not shown).

When a wired method is used to transmit the power from the second power supply to the first power supply, the second power supply and the first power supply may be connected to each other when the display 180 is coupled to the main body frame.

To more conveniently supply power, a wireless charging method may be used. Wireless charging may be performed in a magnetic resonance manner by overlapping a pair of coils, and a charging coil may be used as the first power supply and a transmission coil may be used as the second power supply.

When power is applied to the transmission coil located in the main body frame, a current flows through the transmission coil, forms an electromagnetic field, and supplies power to each component of the display 180 while current flows through the charging coil located in the electromagnetic field formed by the transmission coil.

The remote controller 200 transmits a user input to the user input interface 150. For transmission of user input, the remote controller 200 may use various communication techniques such as Bluetooth, RF communication, IR communication, Ultra Wideband (UWB) and ZigBee. In addition, the remote controller 200 may receive a video signal, an audio signal, or a data signal from the user input interface 150 and output the received signals visually, audibly or as vibrations. For the functions described above, the remote controller 200 may include an input element such as a physical button and a touch screen.

The display device 100 may further include an image capturing unit (not shown). The image capturing unit may capture a user. The image capturing unit may be implemented by one camera, but the present disclosure is not limited thereto, and may be implemented by a plurality of cameras. The image capturing unit may be embedded in the display device 100 or separately disposed on the display 180. Image information photographed by the image capturing unit may be input to the controller 170. The controller 170 may recognize a location of the user based on the image captured by the image capturing unit. For example, the controller 170 may determine a distance (z-axis coordinate) between the user and the display device 100. The controller 170 may identify the x-axis coordinate and the y-axis coordinate in the display 180 corresponding to a user position. The controller 170 may sense a gesture of the user based on an image captured by the image capturing unit, a signal sensed by the sensor unit, or a combination thereof.

The structure of the display device 100 described above may simply control expansion and contraction of the display 30. However, to provide a more improved function, the expansion and contraction needs to be associated with a type and amount of information to be provided, which needs to be supported by appropriate control considering the structure and characteristics of the device 100. The display device 100 basically involves interaction with a user in implementing an intended function. Therefore, through optimization of various controls, the intended functional improvement may be achieved more effectively and efficiently, including improvement of user environment and user interface of the user, and furthermore, the user experience of the smart device 100, such as ease of use and convenience, may also be significantly improved.

The above-described display device 100 may be a fixed or mobile digital broadcast receiver for receiving a digital broadcast.

The block diagram of the image display device 100 illustrated in FIG. 1 is purely exemplary. Depending upon the specifications of the image display device 100 in actual implementation, the components of the image display device 100 may be combined or omitted or new components may be added.

That is, two or more components may be incorporated into one component or one component may be configured as separate components, as needed. In addition, the function of each block is described for the purpose of describing the aspect of this disclosure and thus specific operations or devices should not be construed as limiting the scope and spirit of this disclosure.

Figure 2:
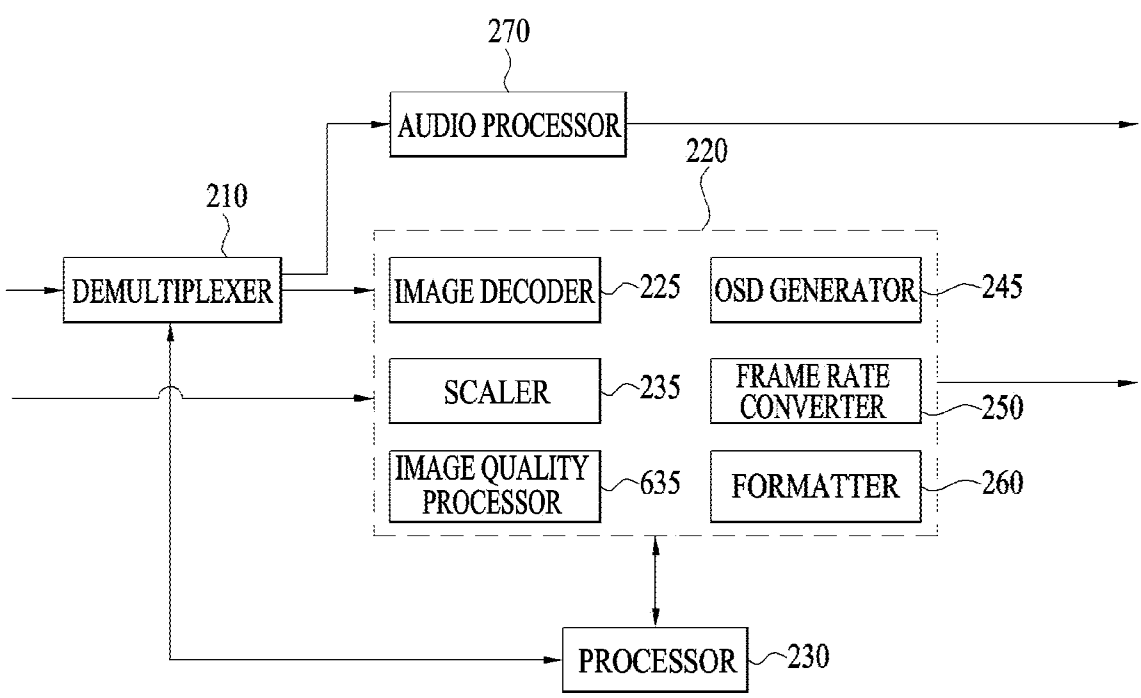
FIG. 2 is a diagram for explaining components of a controller of a display device according to an embodiment of the present disclosure.

FIG. 2 is a diagram for explaining components of a controller of a display device according to an embodiment of the present disclosure.

Referring to FIG. 2, the controller 170 according to an embodiment of the present disclosure may include a demultiplexer 210, an image processor 220, a processor 230, and/or an audio processor 270. The controller 170 may further include a data processor (not shown).

The demultiplexer 210 may demultiplex an input stream. For example, when an MPEG-2 TS is input, the MPEG-2 TS may be demultiplexed into video, audio, and data signals. The stream signal input to the demultiplexer 210 may be a stream signal output from the tuner 110, the demodulator 120, or the external device interface 130.

The image processor 220 may perform signal processing on an input image. For example, the image processor 220 may perform image processing of the demultiplexed video signal from the demultiplexer 210.

To this end, the image processor 220 may include an image decoder 225, a scaler 235, an image quality processor 635, an image encoder (not shown), an OSD generator 245, a frame rate converter 250, and/or a formatter 260.

The video decoder 225 may decode the demultiplexed video signal, and the scaler 235 may perform scaling to output the resolution of the decoded video signal from the display 180.

The image decoder 225 may include decoders of various standards. For example, the image decoder 225 may include MPEG-2 and H.264 decoders, a 3D image decoder for a color image and a depth image, and a decoder for a plurality of view images.

The scaler 235 may scale an input image signal that is completely decoded by the image decoder 225. For example, when the size or resolution of the input image signal is low, the scaler 235 may up-scale the image signal and down-scale the image signal when the size or resolution of the input image signal is high.

The image quality processor 635 may perform image quality processing on an input image signal, which is completely image-decoded by the image decoder 225. For example, the image quality processor 635 may perform noise removal processing of the input image signal, expand a resolution of a grayscale of the input image signal, improve image resolution, perform high dynamic range (HDR)-based signal processing, change a frame image rate, or perform image quality processing corresponding to the characteristics of a panel, in particular, an organic light emitting panel.

The OSD generator 245 may generate an OSD signal according to a user input or autonomously. For example, based on a user input signal, a signal for displaying various types of information on a screen of the display 180 as graphic or text may be generated. The generated OSD signal may include various data such as a user interface screen, various menu screens, widgets, and icons of the image display device 100. The generated OSD signal may include a 2D object or a 3D object.

The OSD generator 245 may generate a pointer to be displayed on a display, based on a pointing signal input from the remote controller 200. In particular, the pointer may be generated by a pointing controller, and the OSD generator 245 may include the pointing controller (not shown). Needless to say, the pointing controller (not shown) may be provided separately without being provided in the OSD generator 245.

The frame rate converter (FRC) 250 may convert a frame image rate of an input image. The frame rate converter 250 may output the frame image rate without separate frame image rate conversion.

The formatter 260 may change a format of an input image signal into an image signal for displaying an image on a display and output the image signal. In particular, the formatter 260 may change the format of the image signal to correspond to the display panel.

The processor 230 may control overall operations of the image display device 100 or the controller 170. For example, the processor 230 may control the tuner 110 to tune to an RF broadcast corresponding to a channel selected by a user or a pre-stored channel.

The processor 230 may control the image display device 100 by a user command input through the user input interface 150 or an internal program. The processor 230 may perform data transmission control with the external device interface 135 or the network interface 130. The processor 230 may control operations of the demultiplexer 210 and the image processor 220 in the controller 170.

The audio processor 270 in the controller 170 may perform voice processing of the demultiplexed audio signal. To this end, the audio processor 270 may include various decoders. The audio processor 270 in the controller 170 may process a base, a treble, and volume control.

The data processor (not shown) in the controller 170 may perform data processing on the demultiplexed data signal. For example, when the demultiplexed data signal is a coded data signal, the demultiplexed data signal may be decoded. The encoded data signal may be electronic program guide information including broadcast information such as a start time and an end time of a broadcast program broadcasted in each channel.

FIG. 2 is a block diagram of the controller 170 according to an embodiment of the present disclosure. Each component of the block diagram may be integrated, added, or omitted according to the specification of the controller 170 actually implemented. In particular, the frame rate converter 250 and the formatter 260 may be separately provided in addition to the image processor 220.

Figure 3:
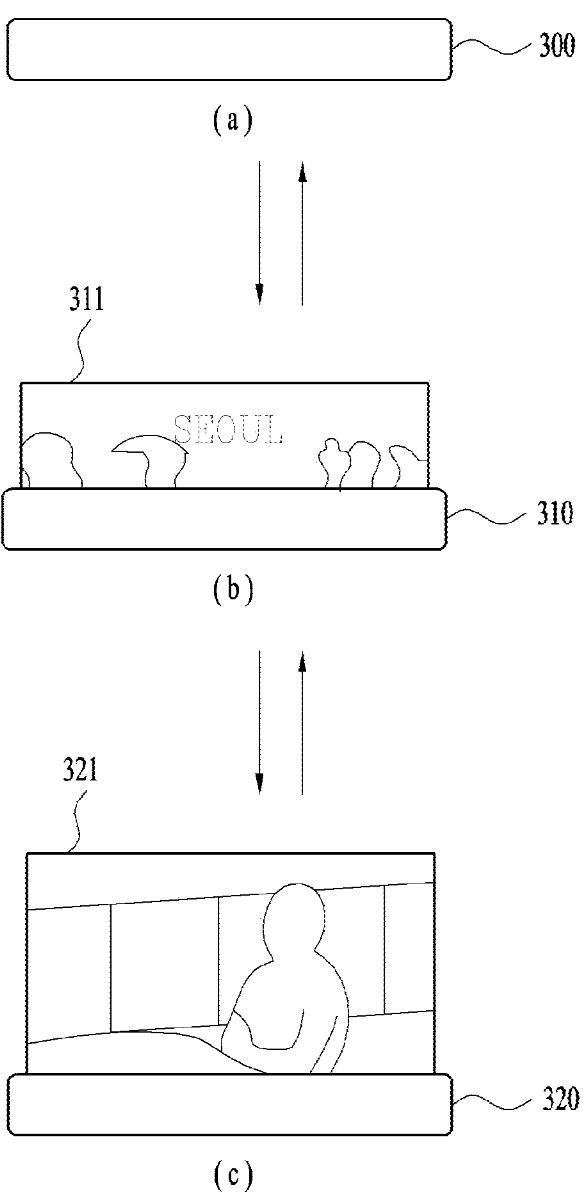
FIG. 3 is a diagram illustrating an operation of a display device according to an embodiment of the present disclosure.

FIG. 3 is a diagram illustrating an operation of a display device according to an embodiment of the present disclosure.

Unlike the related art, the display of the display device according to an embodiment of the present disclosure may be included in the housing 300, as shown in (a) of FIG. 3. When a certain condition is satisfied (for example, when a signal pressing a power button of a remote controller once is input), as shown in (b) of FIG. 3, only a partial region 311 of the display device of the display device may be exposed from the housing 310.

When another certain condition is satisfied (for example, when a signal pressing the power button of the remote controller twice is input), as illustrated in (c) of FIG. 3, an entire region 321 of the display of the display device may be designed to be exposed from the housing 320. Needless to say, a mode in (c) of FIG. 3 may be switched to a mode in (b) and a mode in (a) in a reverse direction, and the mode in (b) may be skipped.

To implement this, the displays 311 and 321 of the display device may include a material for forming a flexible display. For example, a bendable or rollable flexible display material may be for a plastic OLED (POLED or P-OLED), and may be finished with a colorless polyimide (CPI) film, which is a plastic material. Here, the CPI film is for a transparent but rigid plastic material like glass, may freely change a shape, and may not easily break even a pressure is applied.

The displays 311 and 321 may be wound around rollers inside the housings 310 and 320 and then unfolded, and a motor for driving the rollers may be required. This will be described below in more detail with reference to FIG. 6.

To be distinguished from the related art, a display device designed as shown in FIG. 3 may be defined as a rollable display device or a flexible display device, a mode illustrated in (a) of FIG. 3 may be defined as a zero view, a mode illustrated in (b) of FIG. 3 may be defined as a partial view or a line view, and a mode illustrated in (c) of FIG. 3 may be defined as a full view.

Figure 4:
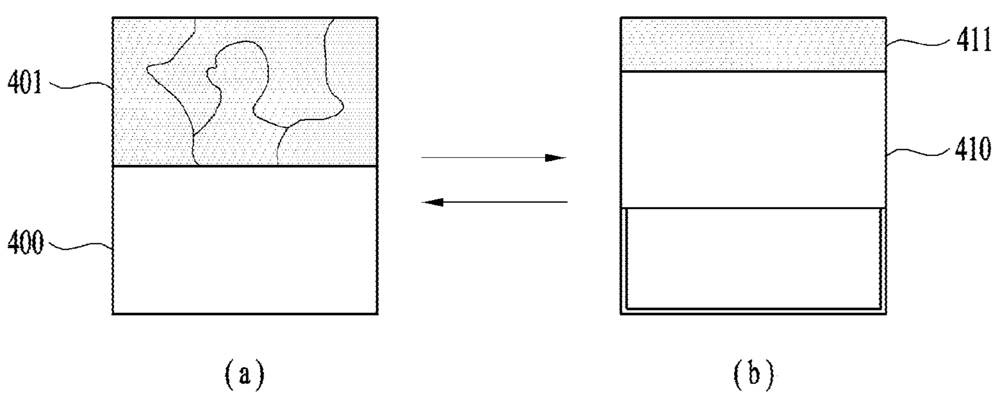
FIG. 4 is a diagram illustrating an operation of a display device according to another embodiment of the present disclosure.

FIG. 4 is a diagram illustrating an operation of a display device according to another embodiment of the present disclosure.

Although it has been described with reference to FIG. 3 that a flexible display material is used for a display of the display device, the display device may not necessarily include a material for a flexible display, and a display of a general display device may be used without change in the embodiment of FIG. 4.

However, differently from the related art, as shown in (a) of FIG. 4, covers 400 having the same size or similar sizes may be positioned under the display 401 of the display device. When a certain condition is satisfied (for example, when a signal pressing a power button of a remote controller once is input), as shown in (b) of FIG. 4, a cover 410 may be designed to move in an up direction to expose only a partial region of a display 411 of the display device. Needless to say, a mode in (a) of FIG. 4 may be switched to a mode shown in (a) of FIG. 4. To freely move the cover shown in FIG. 4 in an up/down direction, a motor may be designed to be positioned around the cover.

To be distinguished from the related art, the display device designed as shown in FIG. 4 may be defined as an Atelier TV, a mode illustrated in (a) of FIG. 4 may be defined as a full view, and a mode illustrated in (b) of FIG. 4 may be defined as a line view or a partial view.

In an embodiment of the present disclosure, as shown in (b) of FIG. 4, the display device may define a line view state as a default mode. That is, unlike FIG. 3, the display device of FIG. 4 may have a line view state rather than a zero view as a default.

Figure 5:
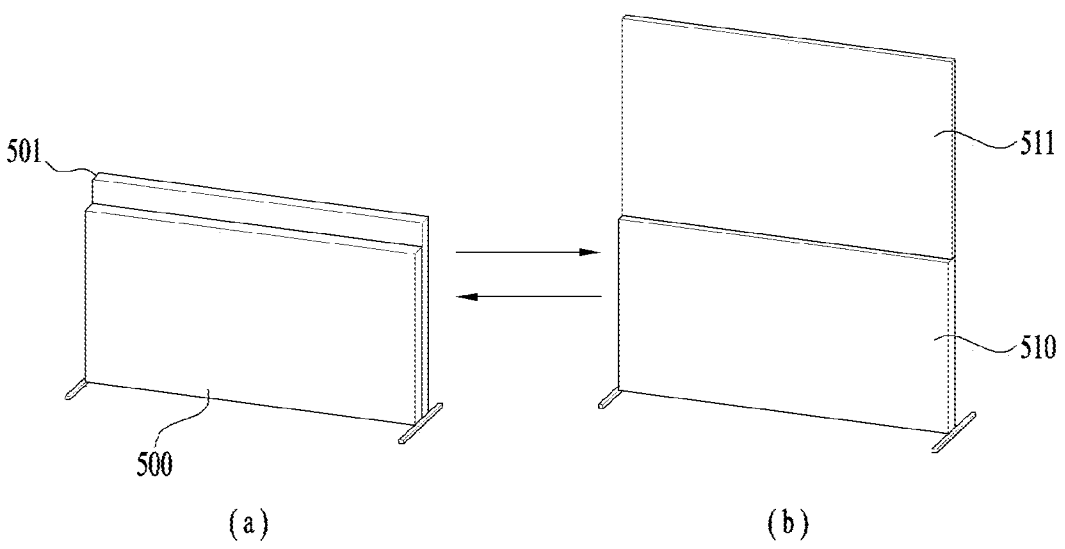

FIG. 5 is a diagram for explaining an operation of a display device according to another embodiment of the present disclosure.

Similar to FIG. 4, a material for a flexible display may not necessarily be used as a display of a display device, and a general display may be used without change. However, differently from FIG. 4, the display of the display device other than a cover itself is moved.

For example, as shown in (a) of FIG. 5, the cover 500 having the same size or similar sizes is designed to be positioned under the display 501 of the display device. A display 501 and the cover 500 of the display device may be apart from each other at a certain interval to prevent friction from being generated. When a certain condition is satisfied (for example, when a signal pressing a power button of the remote controller once is input), as illustrated in (b) of FIG. 5, the display 511 of the display device may move in an up direction to design the entire region of the display 511 of the display device to be exposed. In this case, differently from FIG. 4, a cover 510 may not move.

Needless to say, in a mode of (b) of FIG. 5 may be switched to a mode of (a) of FIG. 5. To freely move the displays 501 and 511 of the display device shown in FIG. 5 in an up/down direction, a motor may be designed around the displays 501 and 511 of the display device.

To be distinguished from the related art, a display device designed as shown in FIG. 5 may be defined as an interior TV, a mode illustrated in (a) of FIG. 5 may be defined as a partial view or a line view, and a mode illustrated in (b) of FIG. 5 may be defined as a full view.

In an embodiment of the present disclosure, as shown in (a) of FIG. 5, the display device may define a partial view state as a default mode. That is, unlike FIG. 3, the display device of FIG. 5 may have a partial view state rather than a zero view as a default.

Figure 6:
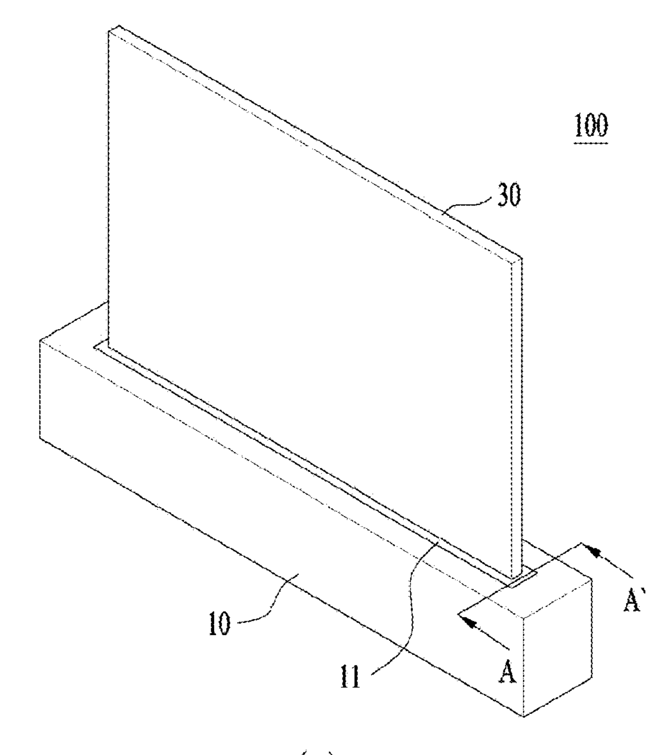
FIG. 6 is a diagram for explaining a motor for adjusting a size of an exposed display region of a display device according to an embodiment of the present disclosure.
Figure 6:
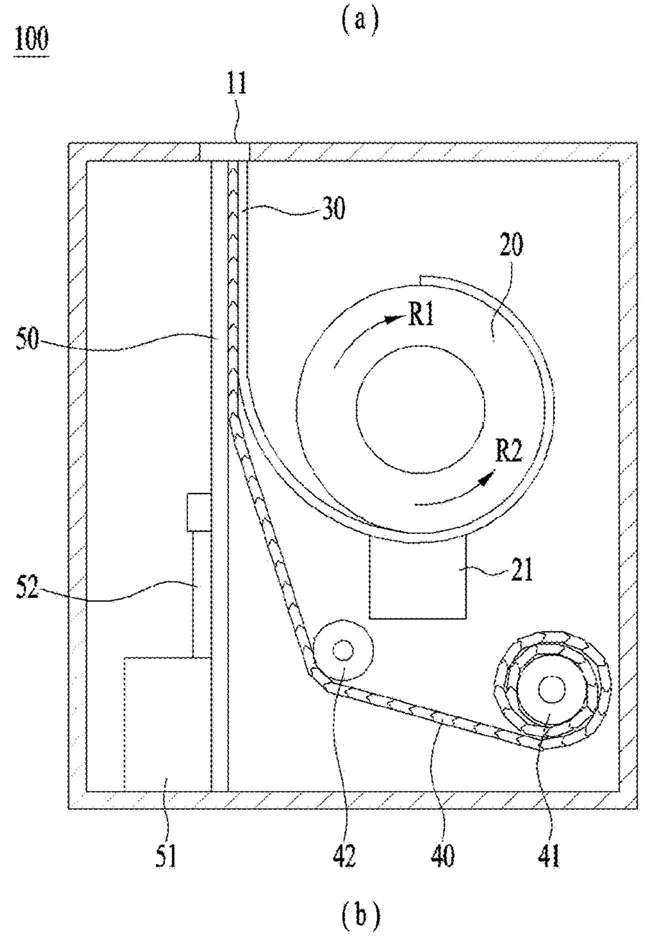

FIG. 6 is a diagram for explaining a motor for adjusting a size of an exposed display region of a display device according to an embodiment of the present disclosure.

Although the motor is applicable to the embodiments of FIGS. 4 and 5, it is assumed that the motor is applied to the display device of FIG. 3 for convenience of description, and FIG. 6 will be described.

(a) of FIG. 6 illustrates a screen of the housing and the display device shown in FIG. 3 in a diagonal direction. (b) of FIG. 6 is a cross-sectional view taken along a line A-A' of (a) of FIG. 6.

As shown in (a) of FIG. 6, the display device 100 may further include the housing 10.

The housing 10 may be configured to accommodate various components, and more particularly, the housing 10 may accommodate, for example, the display 30 and various electronic components for operating the display 30.

As shown in (b) of FIG. 6, the display device 100 may include the roller 20 rotatably installed in the housing 10. Although not shown, the roller 20 may include sleeves formed at both ends, and the sleeves may be rotatably supported with respect to the housing 10 by bearings.

The roller 20 may be connected to the motor 21 installed in the housing 10, and may rotate in a clockwise direction R1 or a counterclockwise direction R2 as illustrated by the motor 21. To adjust a rotation speed of the roller 20, a gear train may be located between the motor 21 and the roller 20.

The display device 100 may include the display 30 configured to display various contents and information related to the contents. For example, the display 30 may display video content, audio content, and other ancillary content. Such contents include various pieces of information associated thereto, for example, a playback time in a video content, a title of the content, and the like, and the display 30 may also display such relevant information. The display 30 may include at least one of a liquid crystal display (LCD), a thin film transistor-liquid crystal display (TFT-LCD), an organic light-emitting diode (OLED) display, a flexible display, a three-dimensional (3D) display, an e-ink display.

In detail, although not shown in detail, the display 30 may include a display module and a window covering the display module. The display module may constitute a display device such as an LCD or an OLED as described above, and may be a component that actually displays image information. The window may be located on a portion exposed to a user of the display module, that is, a front surface in terms of the drawing, and may protect the display module from the outside. In addition to such a protection function, the window needs to allow information displayed on the display module to be shown to the user through the window. Accordingly, the window may include a material having appropriate strength and transparency. The display module may be directly attached to a rear surface of the window. The display module may be directly attached to the window in various ways, and an adhesive may be most conveniently used for direct attachment.

The display 30 may include a touch sensor (not shown) for sensing a touch on the display 30 to receive a control command by a touch method. The content which is input in a touching manner may be a text or a numerical value, or a menu item to be indicated or designated in various modes. The touch sensor may be configured in the form of a film having a touch pattern to be located between the window and the display module, or may include a metal wire which is patterned directly on a rear surface of the window. Alternatively, the touch sensor may be integrally formed with the display module. For example, the touch sensor may be located on a substrate of the display module or may be provided inside the display module. As such, the display 30 may form a touch screen together with the touch sensor, and in this case, the touch screen may function as a user input unit. According to the complex configuration of the display 30, the display 30 is displayed as a single module or an assembly including a plurality of layers, that is, components.

The display 30 may be accommodated in the housing 10 as illustrated in such a manner that the display device 100 may have a compact structure. To accommodate the display 30 in the housing 10, the display 30 needs to be basically deformed. Accordingly, the display device 100 may use a flexible display as the display 30.

The display 30 may include a flexible display to be deformable by an external force. The deformation may be at least one of bending, curving, folding, twisting, and rolling of the display 30. A typical flexible display is manufactured on a thin flexible substrate to be bent, curved, folded, twisted, or rolled, such as paper, while maintaining the characteristics of the existing flat panel display described above, and thus may not easily break. The flexible display 30 may be combined with a touch sensor as described above to implement a flexible touch screen.

Due to this deformable property, as shown in (b) of FIG. 6, the display 30 may be rolled on the roller 20. The display 30 may be wound around the roller 20 or unwound from the roller 20 according to a rotation direction of the roller 20. The display 30 may be unwound from the roller 20 and project or roll out to the outside of the housing 10. On the contrary, the display 30 may be wound around the roller 20 to retract/roll in the housing 10. In detail, as shown in (b) of FIG. 6, when the roller 20 rotates in a clockwise direction R1, the display 30 may be unwound from the roller 20 and be expanded to the outside of the housing 10 through an opening 11 formed in the housing 10.

Therefore, as described above, a screen accommodated in the housing 300 in (a) of FIG. 3 may be extended to the outside of the housing 310 as shown in (b) of FIG. 3, and a screen 311 having a certain size may be formed. When the roller 20 further rotates in the clockwise direction R1, the display 30 may be further unwound from the roller 20. Therefore, as shown in (c) of FIG. 3, the screen may protrude to a larger size outside the housing 10, and may form a screen of a larger size. When the roller 20 rotates in the counterclockwise direction R1, the display 30 may be wound around the roller 20 and may be contracted into the housing 10 through the opening 11. Accordingly, as shown in (b) of FIG. 3, the screen 321 of (c) of FIG. 3 may be contracted to have a relatively smaller size inside the housing 310, thereby forming a smaller screen. When the roller 20 further rotates counterclockwise R2, the display 30 may be further wound around the roller 20. Therefore, as shown in (a) of FIG. 3, the screen may not protrude to the outside of the housing 300, and may be completely accommodated in the housing 300. As described above, the display device 100 may control expansion of the display 20 to a required size, thereby forming a screen of a desired size. When the display device 100 is not in use, the display 20 may be completely accommodated in the housing 10, and the display device 100 may have a compact structure because the display device 100 is expanded only in a required size. As a result, the size of the screen formed on the display 20 may vary according to winding and unwinding of the flexible display 20.

Although not shown, the display device 100 may include a deformation sensor for sensing deformation of the flexible display 30. The deformation sensor may be provided in the flexible display 30 or the housing 10 to detect information related to deformation of the flexible display 30. Here, the information related to the deformation may include a direction in which the flexible display 20 is deformed, a degree of deformation, a deformation position, a deformation time, and an acceleration in which the deformed flexible display 30 is restored, and may further include various information to be sensed by bending of the flexible display 30.

A front portion of the display 30, which is expanded from the display device 100, may be protected by the window, while a rear portion of the display 30 may be exposed. The display 30 includes sensitive electronic components and substrates, and thus the display 30 needs to be properly protected to prevent malfunction. Accordingly, as illustrated in (b) of FIG. 6, the display device 100 may include the cover 40 configured to cover the rear portion of the extended display 30.

The cover 40 may include a plurality of links connected to each other. The link may have a width corresponding to a width of the display 30, and the links connected to each other, that is, the cover 40, may form a single plate covering the rear portion of the display 30. Any one of the links is pivotable with respect to another adjacent link, and thus as shown in the drawing, the cover 40 may be wound around a first roller 41 and may be guided to a rear side of the display 30 by the second roller 42.

When the display 30 is expanded during an operation of the display device 100, the first roller 41 may rotate to unwind the cover 40. The unwound cover 40 is guided by the second roller 41 and is attached to the rear portion of the display 30. Accordingly, the cover 40 may be extended to the outside of the housing 10 together with the display 30 to protect the rear portion of the display 30.

When the display 30 is contracted, the first roller 41 may rotate in an opposite direction to separate the cover 40 from the display 30, and the separated cover 40 may be guided by the second roller 42 to be wound around the first roller 41. In the cover 40, the first roller 41 may be driven by the motor 21 together with the roller 20, and a separate motor for driving the first roller 41 may be installed in the housing 10.

The display 30 may be difficult to maintain an expanded state due to the flexibility thereof. Accordingly, the display device 100 may include the supporter 50 configured to support the extended display 30. The supporter 50 may be extended to the outside of the housing 10 through the opening 11 by the motor 51 and the auxiliary supporter 52 connected thereto. Accordingly, the supporter 50 may be extended to the outside of the housing 10 together with the display 30. Accordingly, the display 30 expanded by the supporter 50 may be stably supported to display content to the user.

Figure 7:
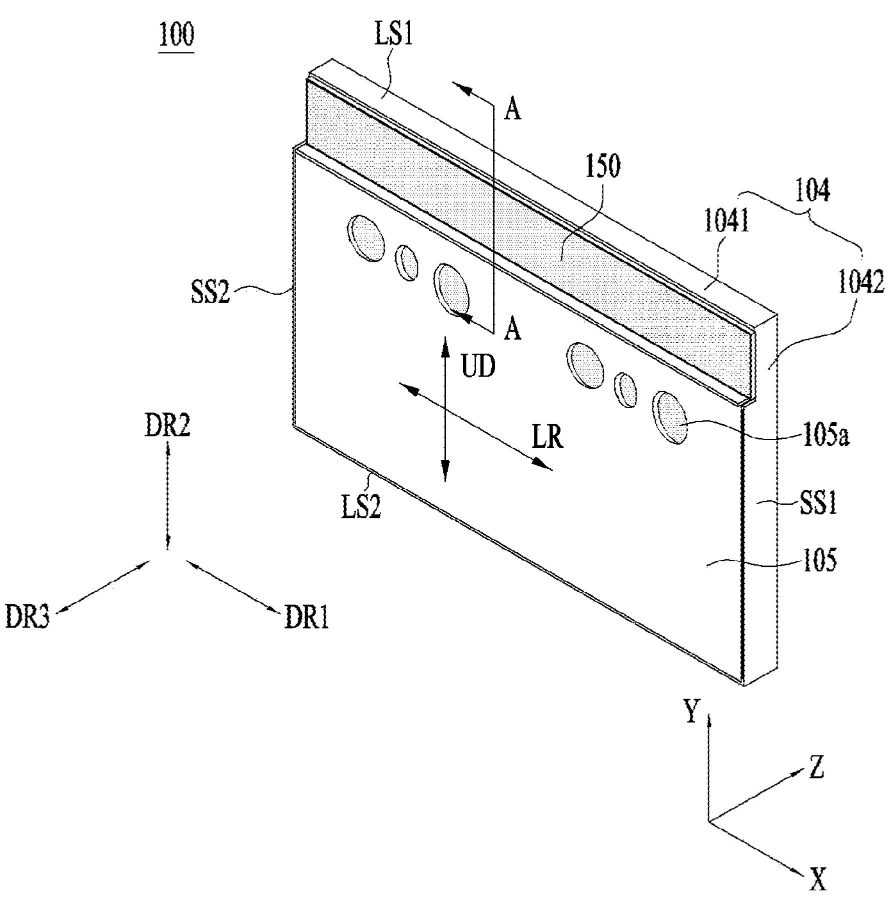
FIGS. 7 and 8 are perspective views illustrating a display device according to an embodiment of the present disclosure.
Figure 8:
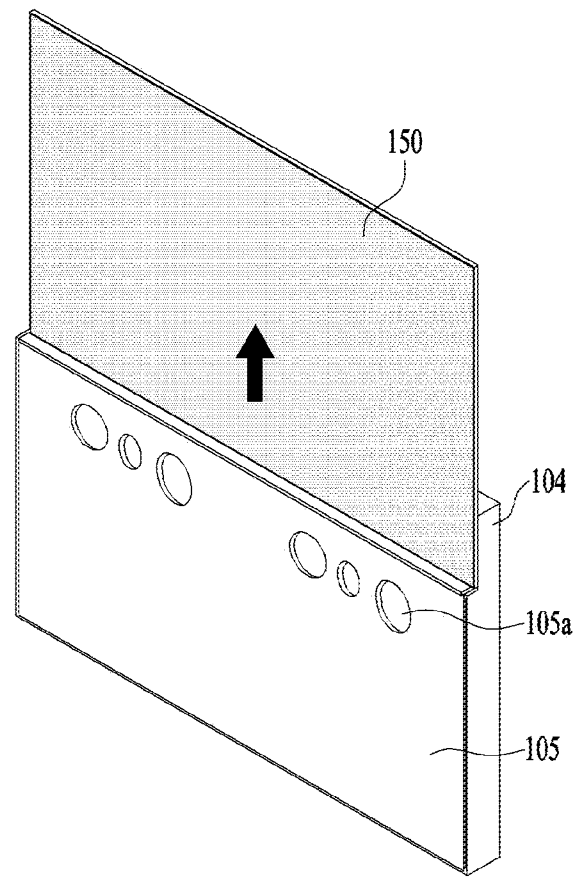

FIGS. 7 and 8 are perspective views illustrating a display device according to an embodiment of the present disclosure.

Referring to FIG. 7, a display device 100 may have a rectangular shape including a first long side LS1, a second long side LS2 facing the first long side LS1, a first short side SS1 adjacent to the first long side LS1 and the second long side LS2, and a second short side SS2 facing the first short side SS1.

Here, the first short side SS1 may be referred to as a first side area, the second short side SS2 may be referred to as a second side area facing the first side area, the first long side LS1 may be referred to as a third side area adjacent to the first side area and the second side area and located between the first side area and the second side area, and the second long side LS2 may be referred to as a fourth side area adjacent to the first side area and the second side area, located between the first side area and the second side area, and facing the third side area.

Although the lengths of the first and second long sides LS1 and LS2 are illustrated to be greater than the lengths of the first and second short sides SS1 and SS2 for convenience of description, the lengths of the first and second long sides LS1 and LS2 may be approximately the same as those of the first and second short sides SS1 and SS2.

In the following description, a first direction DR1 may be parallel to the long sides LS1 and LS2 of the display device 100, and a second direction DR2 may be parallel to the short sides SS1 and SS2 of the display device 100. A third direction DR3 may be a direction perpendicular to the first direction DR1 and/or the second direction DR2.

In another aspect, a side toward which the display device 100 displays an image may be referred to as a front side or a front side. When the display device 100 displays an image, a side toward which an image is not capable of being observed may be referred to as a rear side or a rear surface. When the display device 100 is viewed from the front side or front surface, a side at the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

The first long side LS1, the second long side LS2, the first short side SS1, and the second short side SS2 may be referred to as edges of the display device 100. Points at which the first long side LS1, the second long side LS2, the first short side SS1, and the second short side SS2 intersect with each other may be referred to as corners. Here, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an upward and downward direction UD.

The display device includes a display module 150 occupying most of a front surface and housing 102, 104, and 105 covering a rear surface, a lateral surface, and the like of the display module 150 and packaging the display module 150.

Recently, the display device 100 may use the display module 150 that is to be flexible, such as light emitting didoes (LEDs) or organic light emitting diodes (OLEDs) to implement a curved screen on a plane.

An LCD mainly used in the related art receives light through a backlight unit because the LCD is difficult to emit light by itself. The backlight unit is a light source and is a device for uniformly supplying light supplied from the light source to a liquid crystal positioned on a front surface. Although the backlight unit is gradually thinner and a thin LCD is implemented, it is difficult to implement the backlight unit with a flexible material, and when the backlight unit is bent, it is difficult to uniformly supply light to liquid crystal, thereby changing the brightness of a screen.

On the other hand, in the case of an LED or an OLED, each element constituting a pixel emits light by itself, and thus a backlight unit is not used and the display module 150 may be implemented to be bent. Each element is self-emitting, and thus the display module 150 may be implemented to be bent using an LED or an OLED because the brightness of each element is not affected even though a positional relationship between neighboring elements is changed.

An organic light emitting diode (OLED) panel is mainly registered in the middle of 2010, thereby rapidly replacing an LCD in a small-sized display market. The OLED display is a display made using a self-light emitting phenomenon that light is emitted when a current flows in a fluorescent organic active material, and there is almost no afterimage when an image quality reaction rate is faster than the LCD.

The OLED uses three types of phosphor organic compounds such as red, green, and blue having a self-emission function and is a light emitting display product using a phenomenon in that electrons injected from a negative electrode and a positive electrode and positive electric charges are combined in an organic material to emit light by itself, and thus there is no need for a backlight (backlight device) that deteriorates color.

A LED panel is a technology that uses one LED element as one pixel, and implements the display module 150 to be bent by reducing the size of an LED element compared to a conventional LED element. In a conventional LED TV, an LED is used as a light source of a backlight unit for supplying light to an LCD, and the LED itself dese not constitute a screen.

The display module includes a display panel, a coupling magnet disposed on a rear surface of the display panel, a first power supply, and a first signal module. The display panel may include a plurality of pixels R, G, and B. The plurality of pixels R, G, and B may be formed in each region in which a plurality of data lines and a plurality of gate lines cross each other. The plurality of pixels R, G, and B may be located or arranged in a matrix form.

For example, the plurality of pixels R, G, and B may include a red color (R) sub-pixel, a green color (G) sub-pixel, and a blue color (B) sub-pixel. The plurality of pixels R, G, and B may further include a white color (W) sub-pixel.

A side of the display module 150, which displays an image, may be referred to as a front side or a front surface. When the display module 150 displays the image, a side of the display module 150, from which the image is not observed, may be referred to as a rear side or a rear surface.

In the display device 100 according to the present disclosure, the size of a screen of the display module 150, which is exposed to the outside, may be changed by moving the display module 150 in upward and downward directions. FIG. 7 shows a basic mode in which the display module 150 is exposed to the minimum. FIG. 8 may correspond to an extension mode in which the display module 150 is exposed to the maximum. The display module 150 may be switched to the extension mode from the basic mode while being drawn out to the outside in multiple stages.

For convenience of description, a screen located inside the housings 102, 104, and 105 is referred to as a first region and a screen exposed to the outside is referred to as a second region. The sizes of the first region and the second region may vary.

In the basic mode, the size of the first region is maximum, and the size of the second region is minimum, and in the extension mode, the size of the second region is maximum.

The display module 150 may also include the second region exposed to the outside in the basic mode, and the size of a rear cover 102 in a rear direction may be larger than a front cover 105 located in a front direction in correspondence to the size of the second region exposed in the basic mode. That is, in the basic mode, the size of the second region may correspond to a size difference between the front cover 105 and the rear cover 102.

When the sizes of the front cover 105 and the rear cover 102 are different from each other, a supporting force for supporting the display module 150 may be ensured while the display module 150 is drawn out upward, and simultaneously, an area of the front surface may be utilized to the maximum. When the front cover 105 and the rear cover 102 have the same size, a lower space of the display module 150 may not be utilized, thereby reducing the size of an actually available screen.

For example, when the height of the front cover 105 is 60 cm and the height of the rear cover 102 is 70 cm, the size of the display module 150 may have a size corresponding to the size of the rear cover 102, and thus the display module 150 of 70 cm may be mounted and the size of the second region may correspond to 70 cm in the extension mode. Even when most of the display module 150 is exposed to the outside of the front cover 105, the rear cover 102 supports the rear cover 102, and thus an entire region of the display module 150 may be utilized.

When the heights of the front cover 105 and the rear cover 102 are the same at 60 cm, and about 10 cm of the display module 150 needs to be within the housing in consideration of the supporting force even when the maximum size of the display module 150 is 60 cm and the display module 150 is drawn out to the outside. Therefore, the size of an actual available screen is reduced to 50 cm.

When the heights of the front cover 105 and the rear cover 102 are formed at 70 cm, the size of the display module 150 may be 70 cm, but it is not possible to expose an entire portion of the display module 150 to the outside, and thus the size of an actually available screen is only 60 cm.

In the display device 100 in which the front cover 105 and the rear cover 102 have the same size, to obtain a screen with 70 cm in the extension mode, the size of the housing needs to be 80 cm. In this case, when a user sits on a sofa, the display device 100 is higher than an eye level, making it inconvenient to use the display device 100.

Therefore, when the rear cover 102 is larger than the front cover 105 as in the present disclosure, a screen having a size larger than the size of the front cover 105 may be provided.

The housings 105, 104, and 102 defining an outer appearance of the display device 100 may include the front cover 105 located on a front surface, the rear cover 102 located on a rear surface, and the side cover 104 defining a lateral surface. The front cover 105 and the rear cover 102 have different sizes, and thus a step difference may be formed between the front cover 105 and the rear cover 102, and a first opening through which the display module 150 is drawn in and out may be located at a position at which the step difference is formed.

When the display module 150 is completely inserted into the first opening, the first opening may be exposed, but the display module 150 according to the present disclosure may maintain a state of being inserted into the first opening, thereby minimizing an inflow of foreign substances through the first opening.

The display module according to the present disclosure may be drawn in and out of the housing according to the present disclosure, and thus when the display module 150 is not used (basic mode), the second region may be minimized to prevent a black screen from being exposed to the outside while the display module 150 is not used.

In the basic mode, environment information such as a clock, a temperature, and humidity may be output to the second region exposed at an upper portion to be easily checked by a user. When a notification is generated in a linked mobile terminal or home appliance, an icon for displaying the notification may be output.

When an alarm designated by the user is generated or an important notification is generated, the second region may be expanded and sufficient information may be provided to the user. The user may easily recognize occurrence of the notification through movement of the display module 150.

As illustrated in FIGS. 7 and 8, the front cover 105 may include a second opening 105*a*. A shape of the second opening may have a large size as shown in FIG. 2 and include a size for outputting information through the second opening or may obtain a lighting effect through a fine hole.

Figure 9:
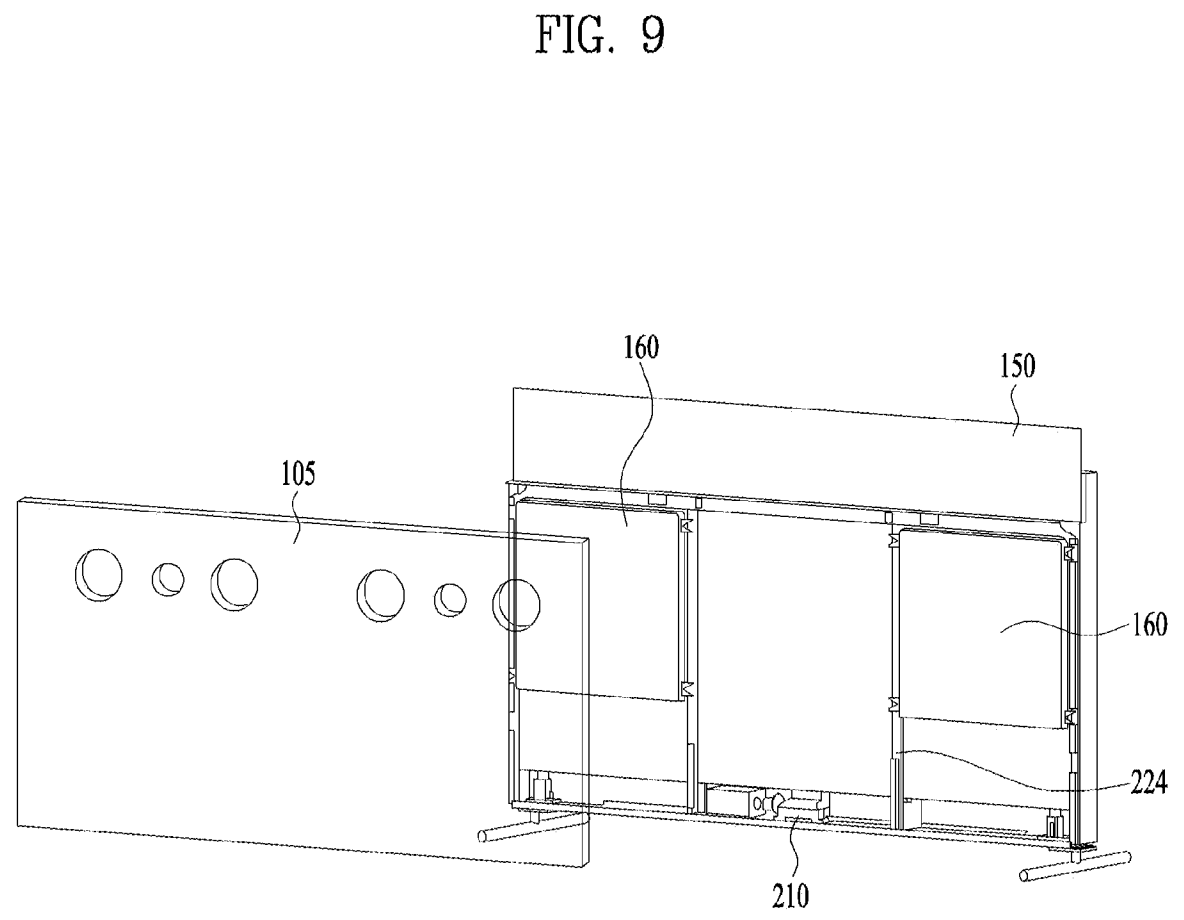

FIG. 9 is a diagram showing a front surface illustrating a state in which a front cover of a display device is removed, according to an embodiment of the present disclosure.

As illustrated in FIG. 9, an audio output unit 160 may be located on a front surface of the display module 150 to output sound through the second opening 105*a*.

Recently, as the thickness of the display device 100 becomes thinner, it tends to use a separate sound output device such as a sound bar or a home theater, but the sound output device occupies an indoor space, and it is difficult for a user to connect the sound output device, and thus inconvenience occurs when the user uses the sound output device.

The audio output unit located in a rear direction of the display device 100 is located opposite to the user, and thus the efficiency of sound output may be degraded, but the sound quality may be improved when the audio output unit is disposed to face the front surface as in the present disclosure.

To fix the audio output unit 160, the audio output unit 160 may be further included on a front surface of the display module 150, and to output surround sound, a pair of audio output units 160 may be provided on the left and the right as shown in FIG. 4, and when a woofer is further provided, the audio output unit 160 may be further placed in a lower portion of the center.

When only listening of music proceeds through the audio output unit 160, as shown in FIG. 7, in the basic mode in which the display module 150 is accommodated, an icon or information required for listening to music may be output to the second region. For example, a title of the music being played and a name of a singer may be displayed or a cover image of an album may be displayed in the second region.

When the display module 150 is drawn out to the maximum as shown in FIG. 8, the display module 150 may move in accordance with an eye level of the user, and the size of the screen exposed to the outside may vary according to the size of the screen to be displayed.

In this case, the audio output unit 160 is located between the front cover 105 and the display module 150, and thus the sound output from the audio output unit 160 may vary while the front cover 105 moves.

In consideration of this, in FIGS. 11 and 12 to be described below, an embodiment in which a sound source and a sound level output from the audio output unit 160 are differently applied based on the movement of the front cover 105 will be described.

Figure 10:
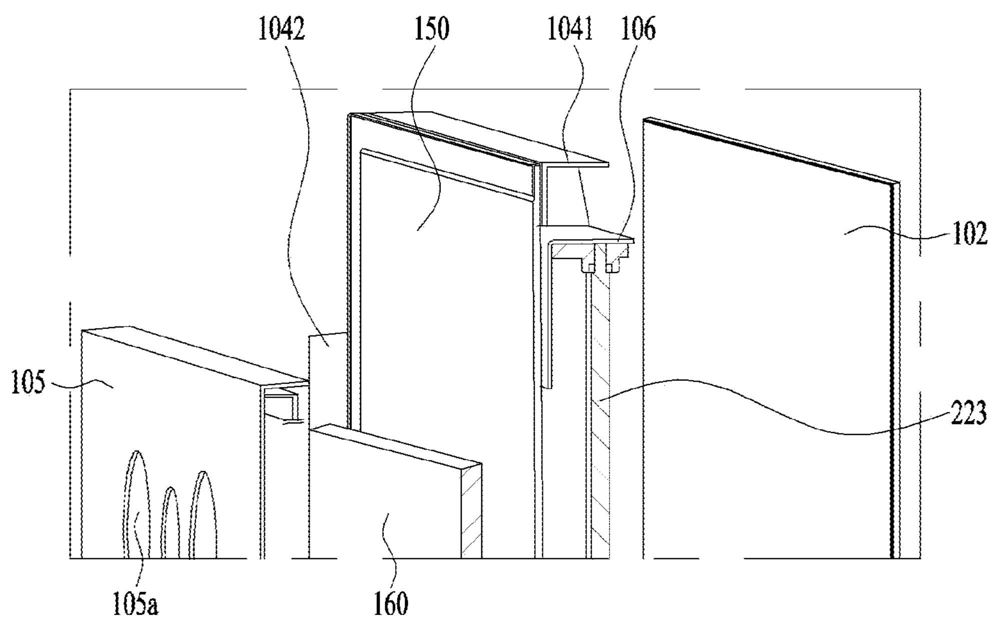
FIG. 10 is an exploded perspective view of a cross section of a display device taken along a line A-A of FIG. 7, according to an embodiment of the present disclosure.

FIG. 10 is an exploded perspective view of a cross section of a display device taken along a line A-A of FIG. 7, according to an embodiment of the present disclosure.

Referring to FIG. 10, the audio output unit 160 may be located between the front cover 105 and the display module 150, and an electronic component such as a circuit board and a driving integrated circuit (IC) as a controller for controlling the display module 150 and the audio output unit 160 may be mounted between the display module 150 and the rear cover 102.

The display device may further include the side cover 104 to ensure an installation space on a rear surface of the display module 150. The side cover 104 may include an upper cover 1041 located on a rear surface of the display module 150 and located above the rear cover 102, and a lateral cover 1042 located at the left and right sides of the display module 150.

The upper cover 1041 and the lateral cover 1042 may define an outer appearance of the display device 100 together with the front cover 105 and the rear cover 102. The upper cover 1041 and the lateral cover 1042 may be integrated with each other or may be configured by connecting straight covers.

The upper cover 1041 is located only on the rear surface of the display module 150, and thus the width of the upper cover 1042 is small, and as shown in FIG. 7, the length of the lateral cover 1042 in a rear direction corresponds to the size of the rear cover 102, and the length of the lateral cover 1042 in a front direction corresponds to the size of the front cover 105, and accordingly, a step difference may be formed at an upper portion of the lateral cover 1042.

Hereinafter, specific embodiments of the display device described above with reference to FIGS. 1 to 10 will be described.

In the embodiments of the present disclosure, it is described that a display device changes the state of a display to one of a first partial view, second partial view, and full view and detects an external terminal. However, such operations may be controlled independently by the controller and modules described above. For the sake of convenience in explanation, it is assumed that the operations are performed by the display device.

The display device described below in embodiments of FIGS. 11 to 20 corresponds to an embodiment in which the display area exposed to the outside changes as the display moves by the motor described above in FIGS. 5 to 10. However, the present disclosure is also applicable to embodiments in which the display area exposed to the outside changes as the cover moves by the motor described above in FIGS. 3 and 4.

For convenience of explanation, in the embodiments of FIGS. 11 to 20, the first partial view is defined as a state in which the first region of the display area is exposed to the outside, and the second partial view is defined as a state in which the second region of the display area is exposed to the outside. In this case, the vertical length of the second region is greater than the vertical length of the first area. In other words, the second partial view corresponds to a state where the display area is more exposed to the outside compared to the first partial view.

In addition, while the first partial view and the second partial view are described as the main embodiment, a third partial view may be defined for the display device. The third partial view corresponds to a state in which a third region of the display area is exposed to the outside, and the vertical length of the third region is greater than the vertical length of the second region. That is, the third partial view corresponds to a state in which the display area is more exposed to the outside compared to the second partial view.

That is, the vertical length of a region exposed to the outside of the display area of the display device in each of the following states: first partial view, second partial view, and third partial view may be defined differently depending on the manufacturer. For example, the second partial view may include a case where the height of the display area exposed to the outside is from a first height to a second height.

The full view corresponds to a state in which the entire display area is exposed to the outside. When the display moves by the motor, the state in which the display is raised to the maximum height may be defined as the full view.

Hereinafter, a display device that controls the size of a display area exposed to the outside based on an event occurrence or control signal will be described.

Figure 11:
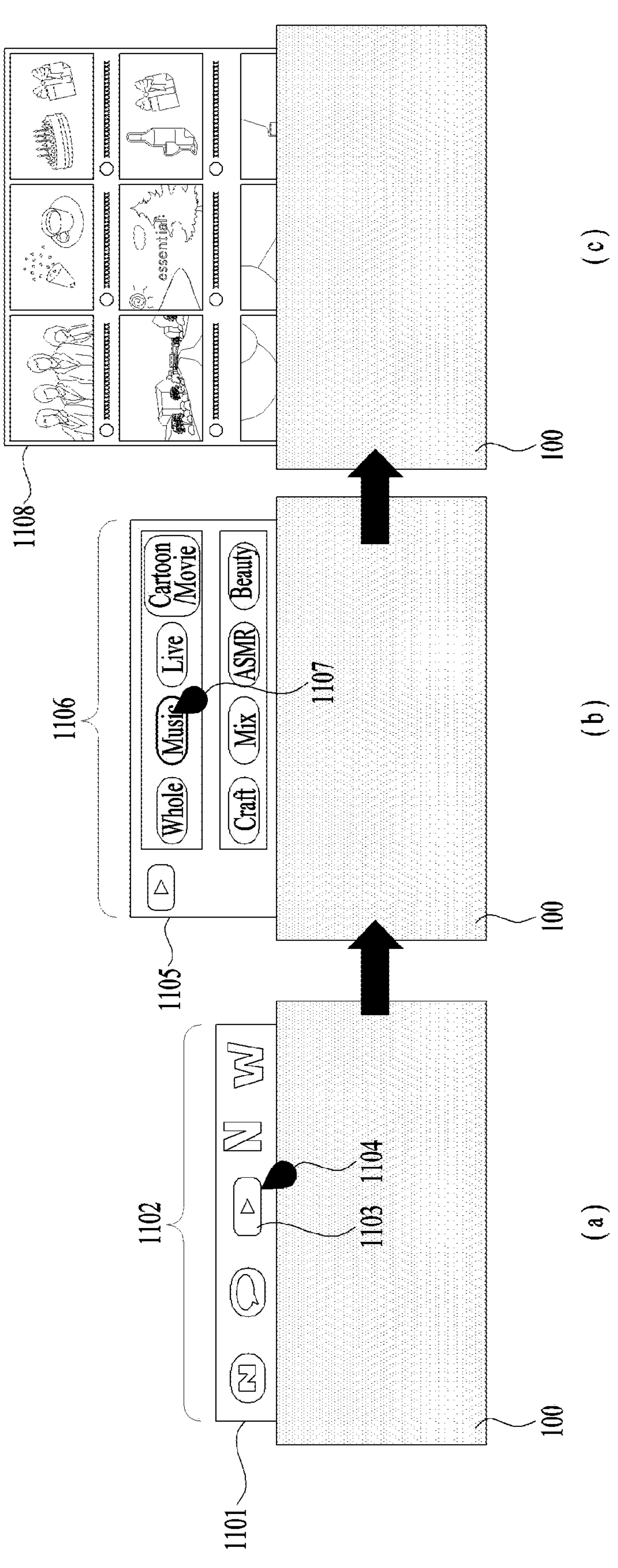
FIG. 11 is a diagram illustrating an example in which a display device exposures a display area to the outside based on an event occurrence according to an embodiment of the present disclosure.

Specifically, FIG. 11 is a diagram illustrating an example in which a display device exposures a display area to the outside based on an event occurrence according to an embodiment of the present disclosure.

Referring to (a) of FIG. 11, a display device 100 may control a display to output first content 1102 on a first partial view 1101 while the display is in the state of the first partial view 1101. In this case, the first content 1102 may correspond to an icon list 1102 including at least one icon. For example, the first content 1102 may correspond to the icon list 1102 corresponding to at least one application executable on the display device 100.

In an embodiment of the present disclosure, the display device 100 may change the state of the display to a second partial view 1105 upon receiving an event occurrence. In this case, the event occurrence may correspond to a first control signal 1104 for selecting a first icon 1103 from the icon list 1102. For example, the display device 100 may receive an input signal for selecting the first icon 1103 from a remote control device (e.g., remote controller). However, this is only an example, and the display device 100 may, of course, receive a signal for selecting the first icon 1103 from the outside through a voice input signal, a touch input signal, etc.

Referring to (b) of FIG. 11, the display device 100 may output second content 1106 on the second partial view 1105 based on the first control signal 1104 for selecting the first icon 1103. In this case, the second content 1106 may correspond to a detailed menu 1106 for the first icon 1103. For example, if the first icon 1103 is an icon corresponding to a video playback application, the second content 1106 may correspond to a genre list 1106 of videos capable of being played in the video playback application.

Referring to (c) of FIG. 11, when the display device 100 receives a second control signal 1107 for the detailed menu 1106, the display device 100 may change the display to a full view 1108. The display device 100 may output content for the detailed menu selected through the second control signal 1107 on the full view 1108. If the detailed menu 1106 is the genre list 1106 of videos capable of being played in the video playback application, the second control signal 1107 for selecting music from the genre list 1106 may be received. Accordingly, the display device 100 may output a video related to music on the full view 1108 while the display is in the state of the full view 1108.

Figure 12:
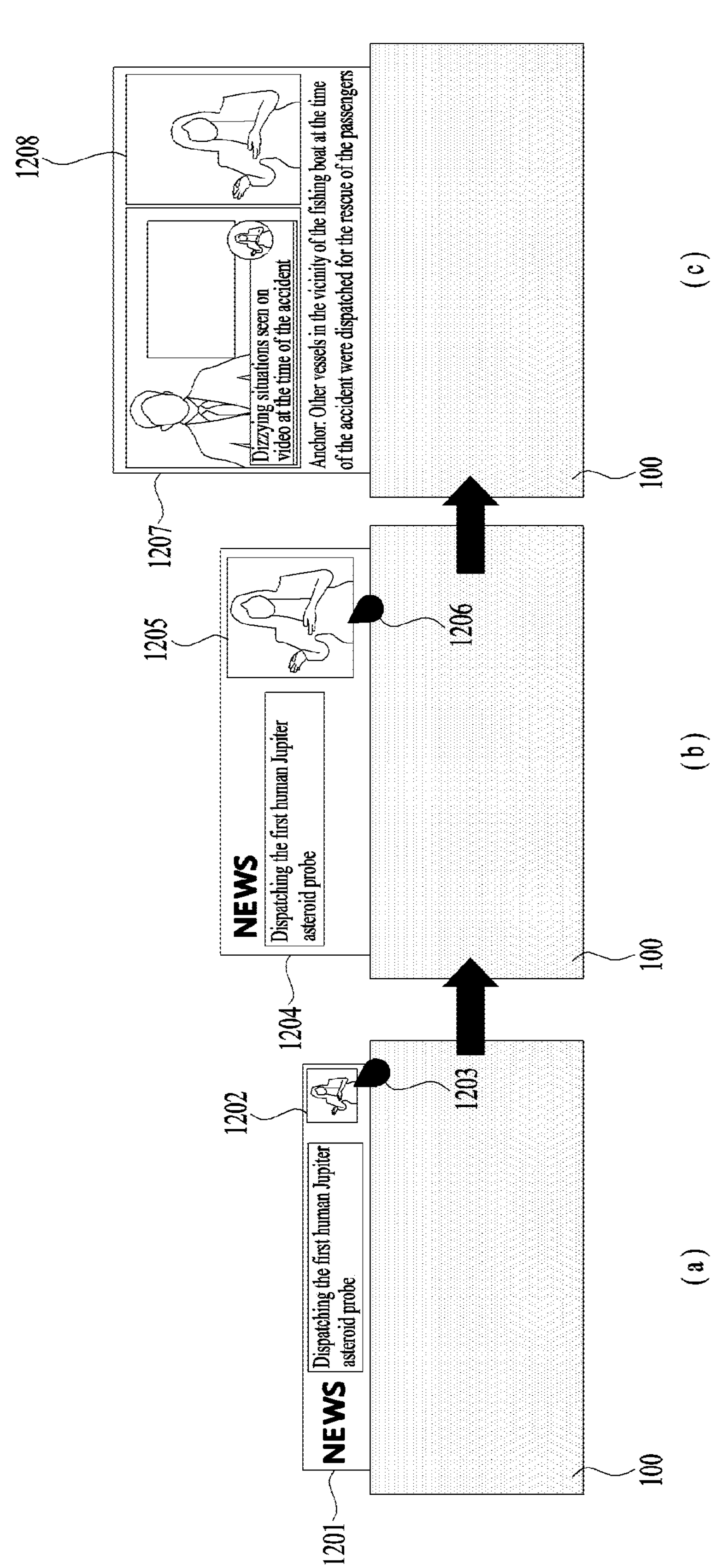
FIG. 12 is a diagram illustrating an example in which a display device exposes a display area to the outside based on a control signal according to an embodiment of the present disclosure.

FIG. 12 is a diagram illustrating an example in which a display device exposes a display area to the outside based on a control signal according to an embodiment of the present disclosure.

In particular, FIG. 12 illustrates a case where the content output by the display device 100 is news.

Referring to (a) of FIG. 12, the display device 100 may control the display to output news on a first partial view 1201 when the display is in the state of the first partial view 1201. In this case, since the size of a display area exposed to the outside of the first partial view 1201 is small, the display device 100 may output audio or subtitles of news on the first partial view 1201.

In an embodiment of the present disclosure, when news is being output on the first partial view 1201, the display device 100 may also output a sign language icon 1202. News is content that should be provided accurately to everyone, and provision of sign language is essential. However, in the state of the first partial view, it may be difficult to properly display sign language because the size of the display area exposed to the outside is small. To address such an issue, the display device 100 may output the sign language icon 1202 on the first partial view 1201. The display device 100 may receive a first control signal 1203 for selecting the sign language icon 1202. The first control signal 1203 may correspond to a signal for selecting the sign language icon 1202 through a remote control device.

Referring to (b) of FIG. 12, the display device 100 may change the state of the display to a second partial view 1204 based on receiving the first control signal 1203. The display device 100 may output a sign language screen 1205 on the second partial view 1204. The display device 100 may scale down and output the sign language screen 1205 based on the size of the second partial view 1204. The display device 100 may receive a second control signal 1206 for selecting the sign language screen 1205.

Referring to (c) of FIG. 12, when the display device 100 receives the second control signal 1206, the display device 100 may change the state of the display to a full view 1207. The display device 100 may output the sign language screen 1208 selected through the second control signal 1206 on the full view 1207. The display device 100 may enlarge and output the sign language screen 108 based on the size of the full view 1207.

In an embodiment of the present disclosure, the display device 100 may output the sign language screen 1208 on the full view 1207 and output news at the same time. In contrast to (a) and (b) of FIG. 12, the display device 100 may output the full-screen news together with the sign language screen 1208 in (c) of FIG. 12.

Figure 13:
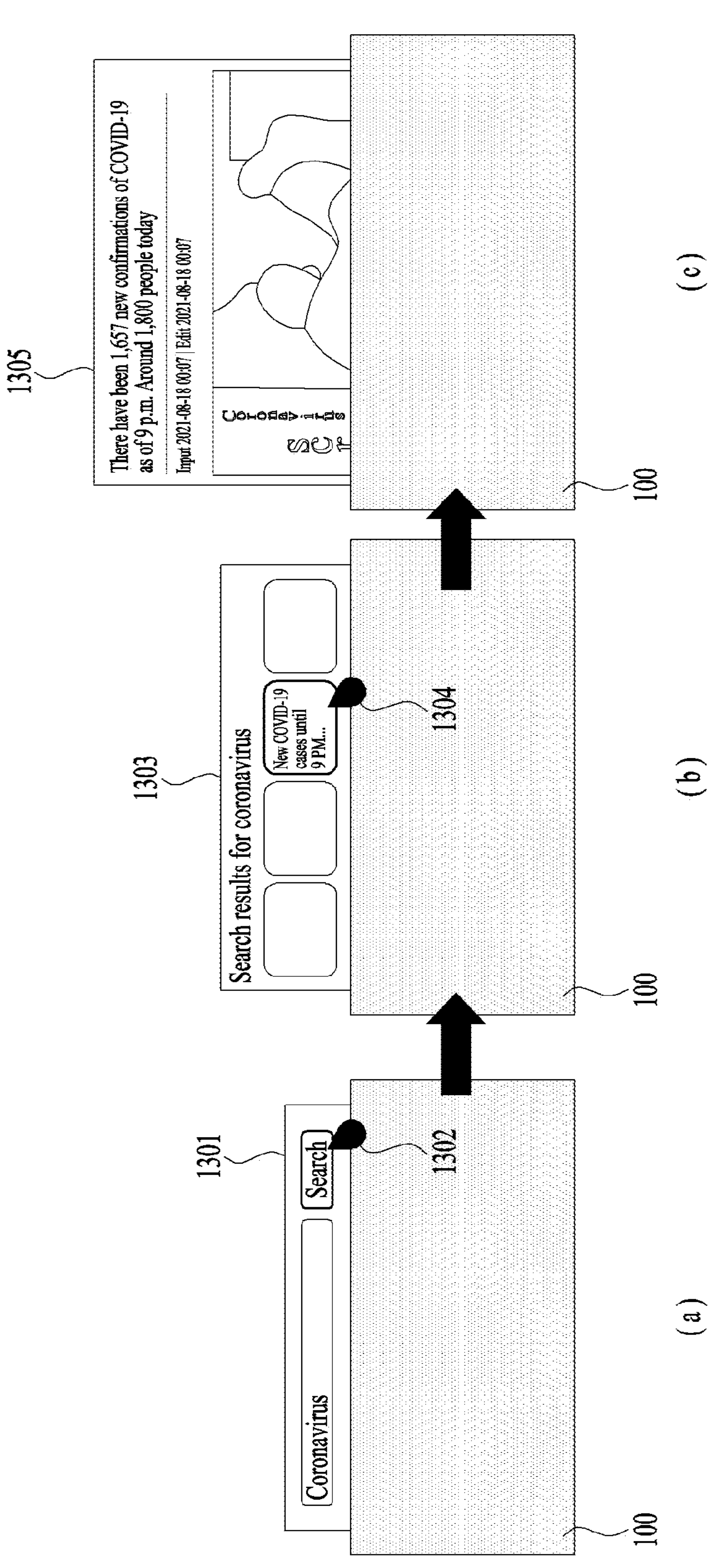
FIG. 13 is a diagram illustrating an example in which a display device exposes a display area to the outside based on a control signal according to another embodiment of the present disclosure.

FIG. 13 is a diagram illustrating an example in which a display device exposes a display area to the outside based on a control signal according to another embodiment of the present disclosure.

Referring to (a) of FIG. 13, a display device 100 may control a display to output a text search screen on a first partial view 1301 while the display is in the state of the first partial view 1301. The text search screen may correspond to a widget form of a searchable web browser application. Therefore, the text search screen may include a text input field capable of text input and a search button. Although the text search screen is connected to the searchable web browser application, the display device 100 may only output the text input field and the search button because the display area exposed to the outside in the first partial view 1301 is limited.

In an embodiment of the present disclosure, the display device 100 may receive a first control signal 1302 for inputting text in the text input field and selecting the search button. Specifically, the display device 100 may receive the first control signal 1302 for inputting text into the text input field on a text search screen and selecting the search button on the text search screen through a keypad included in a remote control device. In addition, although not shown in the drawing, the display device 100 may receive voice signals.

Referring to (b) of FIG. 13, when the display device 100 receives the first control signal 1302, the display device 100 may change the state of the display to a second partial view 1303. The display device 100 may output a list of search results searched based on the text input on the second partial view 1303. The display device 100 may search the text on the web browser application and resize the list of search results to fit the second partial view 1303 for output. Since the second partial view 1303 inherently displays relatively less information compared to a full view 1305, the display device may output the list of search results searched on the web browser application as a keyword list on the second partial view 1303.

In an embodiment of the present disclosure, the display device 100 may receive a second control signal 1304 for selecting a first search result from the list of search results output on the second partial view 1303. For example, the display device 100 may receive the second control signal 1304 for selecting "coronavirus" from the keyword list for search results.

Referring to (c) of FIG. 13, upon receiving the second control signal 1304, the display device 100 may change the state of the display to the full view 1305 and output content for the first search result on the full view 1305. The full view 1305 maximizes the display area exposed to the outside, which allows the display device 100 to output the first search result of the web browser application as it is.

Figure 14:
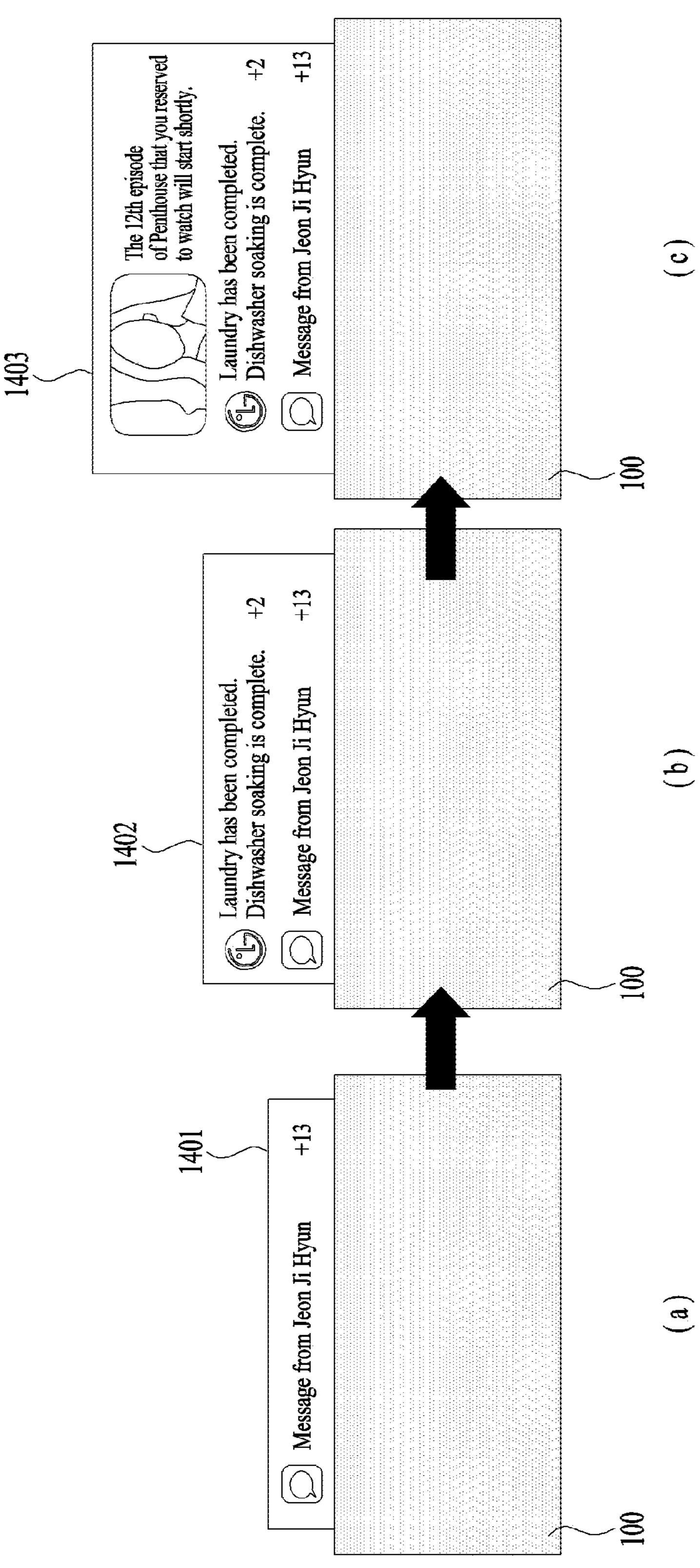
FIG. 14 is a diagram illustrating an example in which a display device exposes a display area to the outside based on an alarm according to an embodiment of the present disclosure.

FIG. 14 is a diagram illustrating an example in which a display device exposes a display area to the outside based on an alarm according to an embodiment of the present disclosure.

Referring to (a) of FIG. 14, when a display device 100 receives a first alarm from the outside, the display device 100 may change the state of the display to a first partial view 1401 and output information about the first alarm on the first partial view 1401.

Referring to (b) of FIG. 14, when the display device 100 additionally receives a second alarm, the display device 100 may change the state of the display to a second partial view 1402 and output information about the second alarm on the second partial view 1402. Specifically, the display device 100 may additionally output the information about the second alarm while outputting the information about the first alarm on the second partial view 1402.

Referring to (c) of FIG. 14, when the display device 100 additionally receives a third alarm, the display device 100 may change the state of the display to a third partial view 1403 and additionally output information about the third alarm on the third partial view 1403. The display device 100 may output the information about the first alarm, information about the second alarm, and information about the third alarm all on the third partial view 1403. In this case, the display device 100 may output the information about the first alarm, which is received first, at the bottom, and the information about the third alarm, which is received most recently, at the top.

In an embodiment of the present disclosure, the display device 100 may control the size of the display area exposed to the outside based on the alarm to be output. Specifically, to output the information about the first alarm, the display area may need to be as large as a first region, and to output the information about the second alarm, the display area may need to be as large as a second region. In this case, when the display device 100 receives the first alarm, the display device 1000 may control the display to be exposed to the outside as much as the first region in the state of first partial view 1401. Additionally, when the display device 100 additionally receives the second alarm, the display device 100 may control the display to be exposed to the outside as much as the second region in the state of the second partial view 1402. In this way, the display device 100 may define the first partial view 1401, second partial view 1402, and third partial view 1403 based on the amount of information to be output based on the received alarm.

Figure 15:
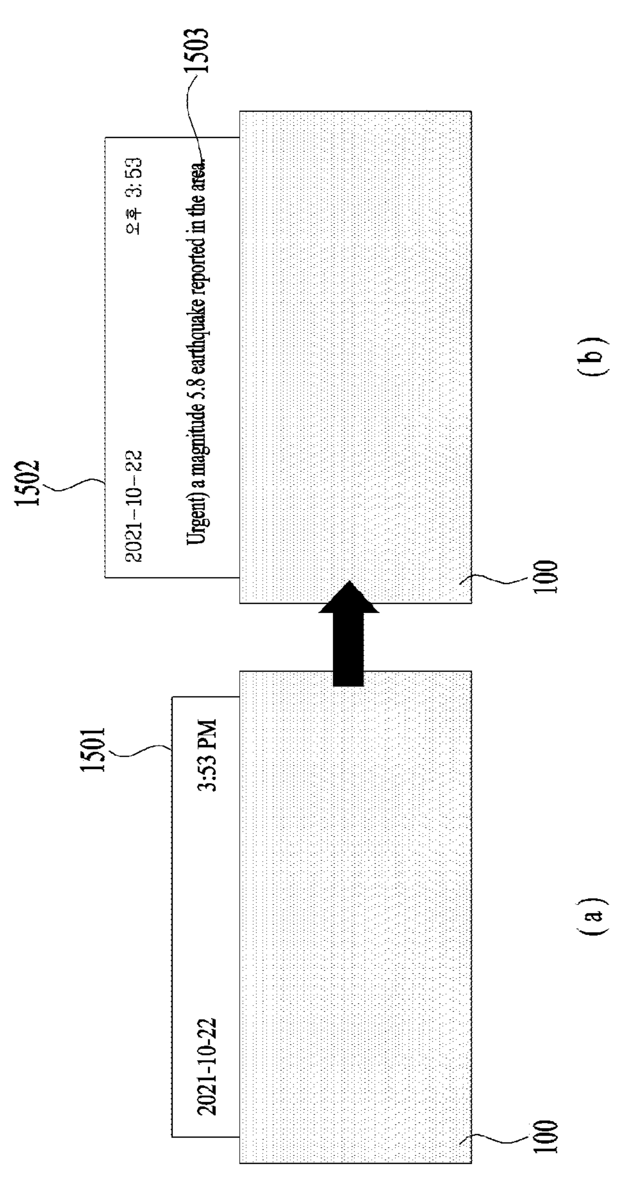
FIG. 15 is a diagram illustrating an example in which a display device exposes a display area to the outside based on an emergency alarm according to an embodiment of the present disclosure.

FIG. 15 is a diagram illustrating an example in which a display device exposes a display area to the outside based on an emergency alarm according to an embodiment of the present disclosure.

Referring to (a) of FIG. 15, a display device 100 may output default content on a first partial view 1501. The default content refers to information such as date, time, weather, etc., that the display device 100 always outputs. That is, the display device 100 may output the default content on the first partial view 1501 even when the power is off, similarly to the Always On Display (AOD) feature of a smartphone.

Referring to (b) of FIG. 15, when the display device 100 receives an emergency alarm from the outside, even if the user does not input a control signal or the user is not around the display device 100, the display device 100 may change the state of the display to a second partial view 1502 and output information 1503 about the emergency alarm on the second partial view 1502.

That is, when an emergency alarm occurs, the display device 100 may automatically change the state of the display from the first partial view 1501 to the second partial view 1502 and output information 1503 about the emergency alarm on the second partial view 1502 even if there are no direct control signals from the user.

Figure 16:
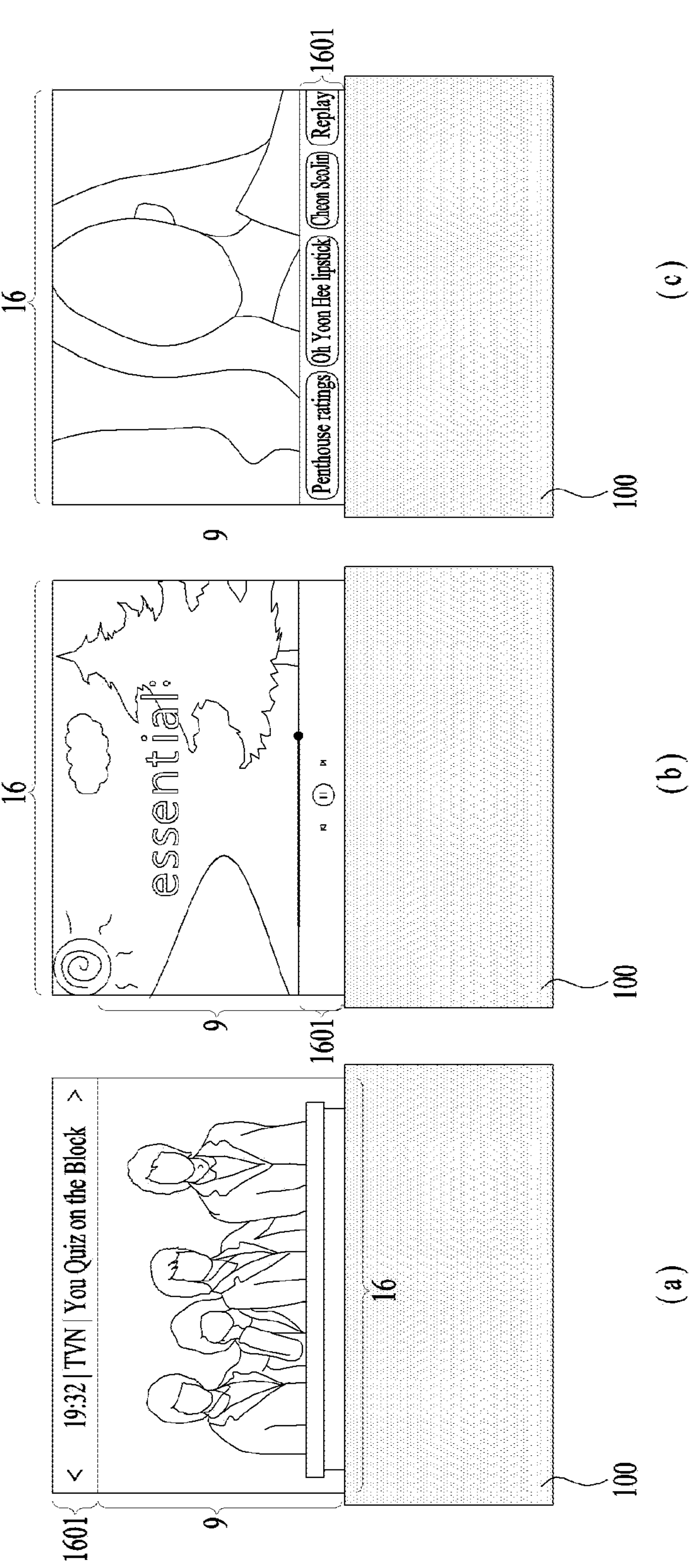
FIG. 16 is a diagram illustrating an example in which a display device outputs additional information in the state of a full view according to an embodiment of the present disclosure

FIG. 16 is a diagram illustrating an example in which a display device outputs additional information in the state of a full view according to an embodiment of the present disclosure In (a), (b), and (c) of FIG. 16, a case where a display device 100 maintains a display in the state of a full view will be described. As described above, when the display is in the state of the full view, it means that the display area exposed to the outside is maximized. The display device 100 may output content in the state of the full view. The content may correspond to content with a width-to-height ratio of 16:9.

Thus, when the display device 100 displays content with a width-to-height ratio of 16:9 in the state of the full view, there may be a black screen area at the top or bottom of the display where no content is output.

In an embodiment of the present disclosure, the display device 100 may output additional information in a predetermined area 1601 while the display is in the state of the full view. The predetermined area 1601 may correspond to the black screen area described above.

In an embodiment of the present disclosure, the display device 100 may determine the predetermined area for outputting the additional information based on the content being output on the full view.

Specifically, in (a) of FIG. 16, the display device 100 may play entertainment in the state of the full view. In this case, the display device 100 may output the current time, the channel of the entertainment being output, and the program name of the entertainment being output in the predetermined area 1601. The predetermined area 1601 in (a) of FIG. 16 may correspond to the top of the display.

Additionally, in (b) of FIG. 16, the display device 100 may play music in the state of the full view. The display device 100 may output a controller for controlling music playback. For example, the controller may include play, pause, previous track, and next track buttons. The predetermined area 1601 in (b) of FIG. 16 may correspond to the bottom of the display.

Additionally, in (c) of FIG. 16, the display device 100 may play a drama in the state of the full view. The display device 100 may output a collection of keywords for the drama being played. For example, the collection of keywords may include the viewer ratings of the drama being played, information about the actors in the drama, and products featured in the drama being played.

Referring to (a), (b) and (c) of FIG. 16, the display device 100 may output different additional information in different areas based on the content being output on the full view. The display device 100 may receive the additional information (metadata about content) from the server. Additionally, the area for displaying the additional information may be determined by user configurations.

Unlike the aforementioned embodiment, the full view may not necessarily represent the maximum display area exposed to the outside. For example, a state where the display area has an aspect ratio of 16:9 may be defined as the full view, and a state with the display area exposed to the outside is maximized may be defined as a plus view.

In this case, the display device 100 may output content with an aspect ratio of 16:9 in the state of the full view. When the display device 100 receives a control signal (for example, a signal from a remote control device) to output additional information, the display device 100 may change the state of the display to the plus view. Consequently, the display device 100 may output the additional information in the predetermined area 1601 in the state of the plus view.

Hereinafter, a display device that change a screen based on information received by the display device from an external terminal will be described with reference to FIGS. 17 to 19*b*. To this end, the display device may receive information from the external terminal using one of the broadcast receiver 105, the network interface 130, and the external device interface 135 described above in FIG. 1. However, the display device will be described as receiving information from the external terminal through a communication module.

Figure 17:
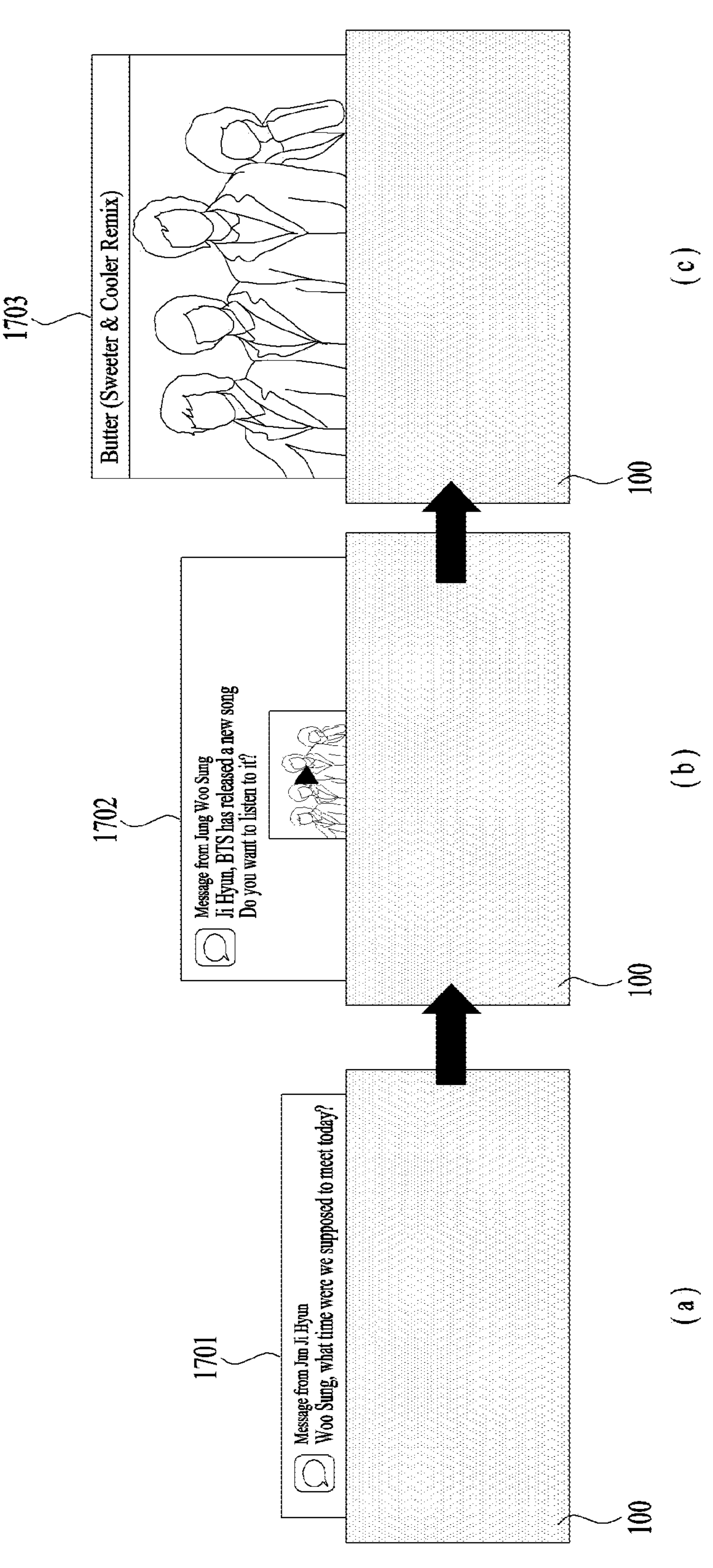
FIG. 17 is a diagram illustrating an example in which a display device changes a screen based on information received by the display device according to an embodiment of the present disclosure.

FIG. 17 is a diagram illustrating an example in which a display device changes a screen based on information received by the display device according to an embodiment of the present disclosure.

In an embodiment of the present disclosure, a display device 100 may change the state of a display to either a first partial view 1701 or a second partial view 1702 based on information received from an external terminal.

An example in which the external terminal receives an instant message will be described in (a) of FIG. 17, and an example in which the external terminal receives an instant message containing an image or video will be described in (b) of FIG. 17.

The display device 100 is connected to the external terminal, and thus, the display device 100 may share information received by the external terminal from an external server. For example, when the external terminal receives a text message, the external terminal may transmit information about the text message to the display device 100 in order to display the received text message on the display device 100. The display device 100 may determine whether the text message contains only text or an image or video.

Referring to (a) of FIG. 17, the display device 100 may receive a text message from the external terminal. The display device 100 may change the state of the display to the first partial view 1701 and output the text message received from the external terminal on the first partial view 1701.

Referring to (b) of FIG. 17, the display device 100 may receive a text message containing an image or video from the external terminal. The display device 100 may change the state of the display to the second partial view 1702 and output a thumbnail of the image or video received from the external terminal along with the text of the text message on the second partial view 1702.

Additionally, the display device 100 may receive control signals for thumbnails.

Referring to (c) of FIG. 17, when the display device 100 receives a control signal for the thumbnail, the display device 100 may change the state of the display to a full view 1703 and output the entire content for the thumbnail on the full view 1703.

That is, the display device 100 may automatically change the state of the display to either the first partial view 1701 or second partial view 1702 based on information received from the external terminal and then change the state of the display to the full view 1703 based on the control signal for selecting the thumbnail.

Recently, mobile terminals with various form factors have been developed. In particular, the mobile terminal may change the size of the display in various ways. In situations where the size of the display of the mobile terminal varies, a display device receiving information from the mobile terminal may also control the size of the display. In particular, if the display device is capable of changing the display depending on the state of the display of the mobile terminal that transmits to the display device, a more user-friendly environment may be expected.

In examples of FIGS. 18*a* and 18*b*, a mobile device with a flexible display where the display folds in half along a horizontal line dividing the display into upper and lower parts will be described. In examples of FIGS. 19*a* and 19*b*, a mobile device with a flexible display where the display folds in half along a vertical line, dividing the display into left and right parts will be described.

Figure 18A:
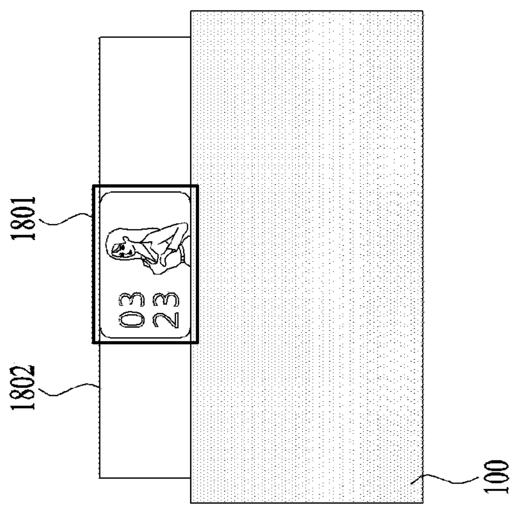
FIGS. 18*a* and 18*b* are diagrams illustrating an example in which a display device changes a screen based on the state of an external terminal according to an embodiment of the present disclosure.
Figure 18A:
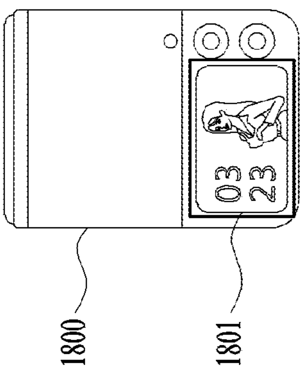
Figure 18B:
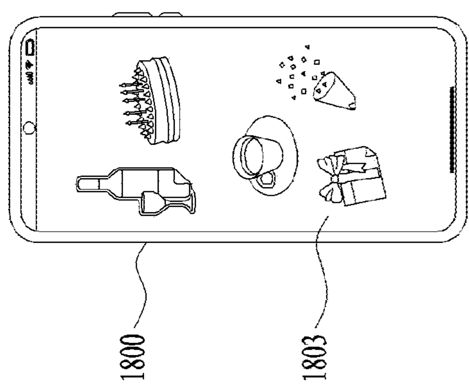

FIGS. 18*a* and 18*b* are diagrams illustrating an example in which a display device changes a screen based on the state of an external terminal according to an embodiment of the present disclosure.

FIG. 18*a* shows a state in which a flexible display of a mobile terminal 1800 is folded, and FIG. 18*b* shows a state in which the flexible display of the mobile terminal 1800 is unfolded. In particular, the mobile terminal 1800 of FIGS. 18*a* and 18*b* has the flexible display, which is the main display, and a sub-display outside the housing of the mobile terminal 1800.

Referring to FIG. 18*a*, a display device 100 may receive information on the screen of the mobile terminal 1800. In an embodiment of the present disclosure, when the flexible display of the mobile terminal 1800 is folded, the mobile terminal 1800 may output first content 1801 on the sub-display located outside the housing. The sub-display is smaller in size than the main display of the mobile terminal 1800. The display device 100 may receive information about the location of the display of the mobile terminal 1800 where the first content 1801 is being output.

Referring to the right drawing of FIG. 18*a*, when the first content 1801 is being output on the sub-display outside the housing of the mobile terminal 1800, the display device 100 may change the state of a display to a first partial view 1802. In this case, the vertical height of the first partial view 1802 may be determined based on the first content 1801 being output on the mobile terminal 1800. To stably output the first content 1801, which is being output on the mobile terminal 1800, on the display device 100, the display device 100 may expose some areas of the display to the outside.

In an embodiment of the present disclosure, the display device 100 may receive the first content 1801 being output on the sub-display of the mobile terminal 1800 from the mobile terminal 1800 and output the first content 1801 on the first partial view 1802. The display device 100 may output the received first content 1801 on the first partial view 1802 of the display through mirroring.

Referring to FIG. 18*b*, the display device 100 may receive the information on the screen of the mobile terminal 1800, similarly to FIG. 18*a*. In an embodiment of the present disclosure, when the flexible display of the mobile terminal 1800 is unfolded, the mobile terminal 1800 may output second content 1803 on the main display. The main display is larger in size than the sub-display of FIG. 18*a*. The display device 100 may receive information about the location of the display of the mobile terminal 1800 where the second content 1803 is being output.

Referring to the right drawing of FIG. 18*b*, when the second content 1803 is being output on the sub-display outside the housing of the mobile terminal 1800, the display device 100 may change the state of the display to a second partial view 1804. In this case, the vertical height of the second partial view 1804 may be determined based on the second content 1803 being output on the mobile terminal 1800. To stably output the second content 1803, which is being output on the mobile terminal 1800, on the display device 100, the display device 100 may expose some areas of the display to the outside. In this case, if the flexible display of the mobile terminal 1800 is unfolded and the second content 1803 is maximally output, the display device 100 may change the state of the display to a full view.

In an embodiment of the present disclosure, the display device 100 may receive the second content 1803 being output on the main display of the mobile terminal 1800 from the mobile terminal 1800 and output the second content 1803 on the second partial view 1804. The display device 100 may output the received second content 1803 on the second partial view 1804 of the display through mirroring.

Figure 19A:
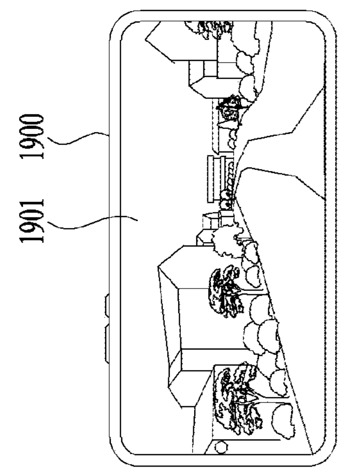
FIGS. 19*a* and 19*b* are diagrams illustrating an example in which a display device changes a screen based on the state of an external terminal according to another embodiment of the present disclosure.
Figure 19B:
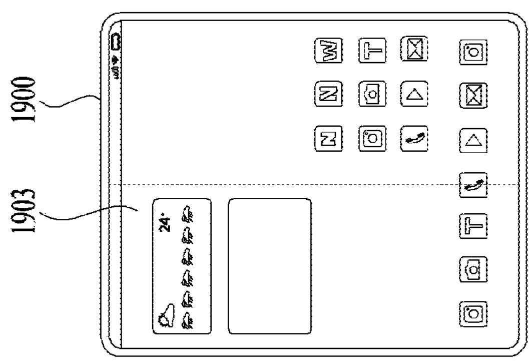

FIGS. 19*a* and 19*b* are diagrams illustrating an example in which a display device changes a screen based on the state of an external terminal according to another embodiment of the present disclosure.

FIG. 19*a* shows a state in which a flexible display of a mobile terminal 1900 is folded, and FIG. 19*b* shows a state in which the flexible display of the mobile terminal 1900 is unfolded. In particular, the mobile terminal 1900 of FIGS. 19*a* and 19*b* has the flexible display, which is the main display, and a sub-display outside the housing of the mobile terminal 1900.

Referring to FIG. 19*a*, a display device 100 may receive information on the screen of the mobile terminal 1900. In an embodiment of the present disclosure, when the flexible display of the mobile terminal 1900 is folded, the mobile terminal 1900 may output first content 1901 on the sub-display located outside the housing. The sub-display is smaller in size than the main display of the mobile terminal 1900. The display device 100 may receive information about the location of the display of the mobile terminal 1900 where the first content 1901 is being output.

Referring to the right drawing of FIG. 19*a*, when the first content 1901 is being output on the sub-display outside the housing of the mobile terminal 1900, the display device 100 may change the state of a display to a first partial view 1902. In this case, the vertical height of the first partial view 1902 may be determined based on the first content 1901 being output on the mobile terminal 1900. To stably output the first content 1901, which is being output on the mobile terminal 1900, on the display device 100, that is, to properly output the first content 1901 on the display, the display device 100 may expose some areas of the display to the outside.

In an embodiment of the present disclosure, the display device 100 may receive the first content 1901 being output on the sub-display of the mobile terminal 1900 from the mobile terminal 1900 and output the first content 1901 on the first partial view 1902. The display device 100 may output the received first content 1901 on the first partial view 1902 of the display through mirroring.

Referring to FIG. 19*b*, the display device 100 may receive the information on the screen of the mobile terminal 1900, similarly to FIG. 19*a*. In an embodiment of the present disclosure, when the flexible display of the mobile terminal 1900 is unfolded, the mobile terminal 1900 may output second content 1903 on the main display. The main display is larger in size than the sub-display of FIG. 19*a*. The display device 100 may receive information about the location of the display of the mobile terminal 1900 where the second content 1903 is being output.

Referring to the right drawing of FIG. 19*b*, when the second content 1903 is being output on the main display of the mobile terminal 1900, the display device 100 may change the state of the display to a second partial view 1904. In this case, the vertical height of the second partial view 1904 may be determined based on the second content 1903 being output on the mobile terminal 1900. To stably output the second content 1903, which is being output on the mobile terminal 1900, on the display device 100, the display device 100 may expose some areas of the display to the outside. In this case, if the flexible display of the mobile terminal 1900 is unfolded and the second content 1903 is maximally output, the display device 100 may change the state of the display to a full view.

In an embodiment of the present disclosure, the display device 100 may receive the second content 1903 being output on the main display of the mobile terminal 1900 from the mobile terminal 1900 and output the second content 1903 on the second partial view 1904. The display device 100 may output the received second content 1903 on the second partial view 1904 of the display through mirroring.

Figure 20:
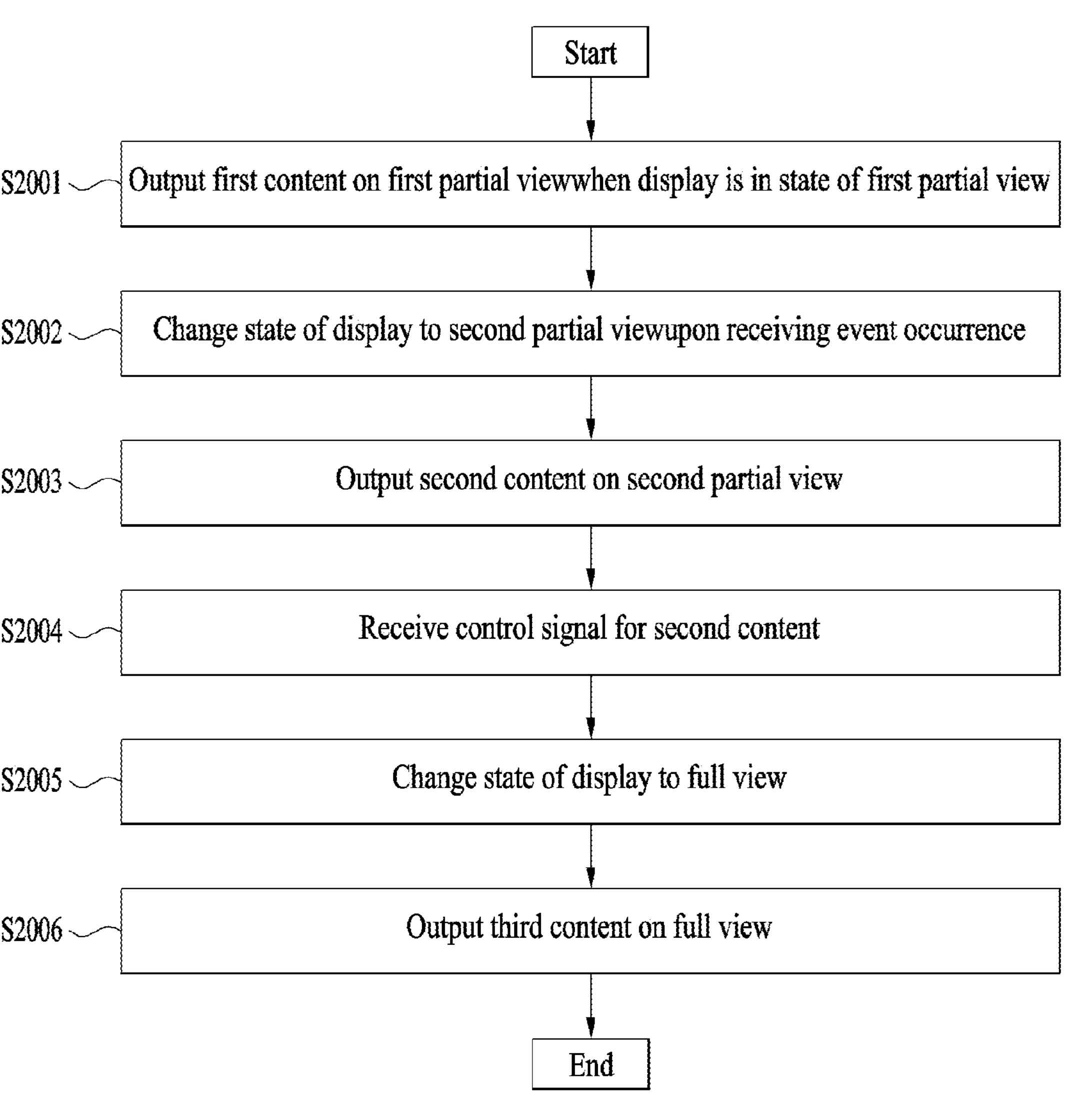
FIG. 20 is a flowchart for explaining a control method for a display device according to an embodiment of the present disclosure.

FIG. 20 is a flowchart for explaining a control method for a display device according to an embodiment of the present disclosure.

Referring to FIG. 20, in step S2001, the display device may output first content on a first partial view when a display is in the state of the first partial view. The first content may correspond to an icon list including at least one icon. In addition, the first content may correspond to a text search screen.

In step S2002, upon receiving an event occurrence, the display device may change the state of the display to a second partial view. For example, the event occurrence may correspond to a control signal for selecting a first icon from the icon list, a control signal for selecting a search icon, an emergency alarm, etc.

The second partial view has a larger display area exposed to the outside, compared to the first partial view.

In step S2003, the display device may output second content on the second partial view. For example, the second content may correspond to a detailed menu for the first icon. In addition, the second content may correspond to a list of search results.

In step S2004, the display device may receive a control signal for the second content. For example, the display device may receive a control signal for selecting the detailed menu.

In step S2005, the display device may change the state of the display to a full view based on the control signal for the second content.

In step S2006, the display device may output third content on the full view. For example, the display device may output content for the detailed menu on the full view. In addition, the display device may output content for search results on the full view.

In an embodiment of the present disclosure, when the display is in the state of the full view, the display device may output additional information in a predetermined area. The predetermined area may be determined based on the content being output on the full view.

Figure 21:
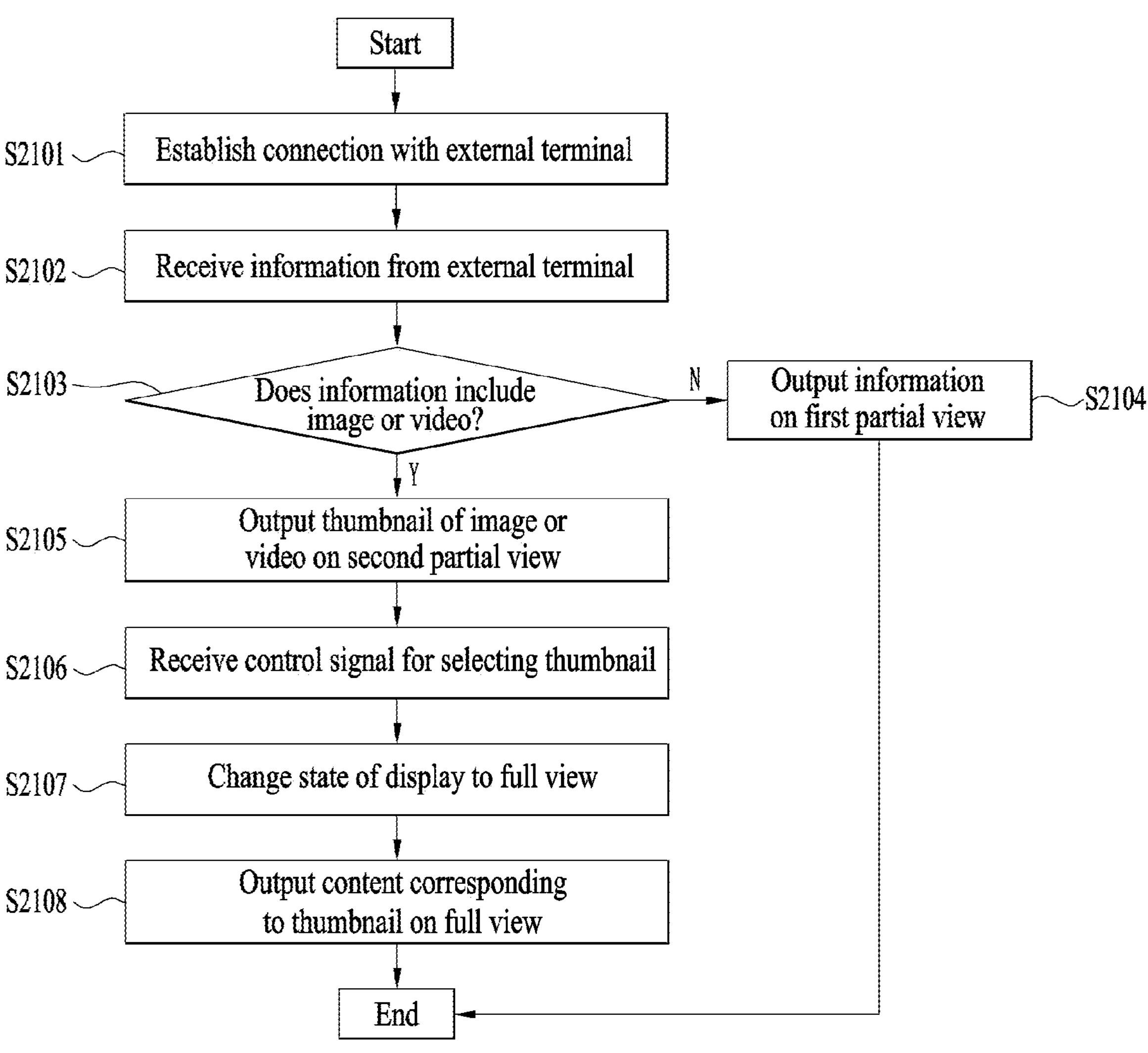
FIG. 21 is a flowchart for explaining a control method for a display device according to another embodiment of the present disclosure.

FIG. 21 is a flowchart for explaining a control method for a display device according to another embodiment of the present disclosure.

Referring to FIG. 21, in step S2101, the display device may be connected to an external terminal.

In step S2102, the display device may receive information from the external terminal.

In step S2103, the display device may determine whether the received information includes an image or video.

In step S2104, if the received information includes no image or video, the display device may output the information on a first partial view. In this case, if the state of a display is not the first partial view, the display device may change the state of the display to the first partial view and then output the information on the first partial view.

In step S2105, if the received information includes the image or video, the display device may output a thumbnail of the image or video on a second partial view.

In step S2106, the display device may receive a control signal for selecting the thumbnail.

In step S2107, the display device may change the state of the display to a full view.

In step S2108, the display device may output content corresponding to the thumbnail on the full view on a full-screen mode. In this case, the display device may receive the content from the external terminal and output the received content on the display through mirroring.

The embodiments described above with reference to FIGS. 1 to 19 may be implemented as a display device control method as described in FIGS. 20 and 21. That is, for convenience of explanation, although the embodiments in FIGS. 1 to 19 are described as being performed by display devices, it should be understood that all embodiments are capable of being implemented as a display device control method.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

Mode

In the previous section titled "Best Mode," various embodiments of the present disclosure have been described, and it is understood that combining embodiments depicted in two or more drawings, as needed by those skilled in the art, also falls within the scope of the present disclosure.

INDUSTRIAL APPLICABILITY

The present disclosure is applicable to a display device of various form factors, and thus industrially applicable.

What is claimed is:

1. A display device comprising:

a communication module configured to communicate externally;

a display having a display area for outputting content;

a motor configured to control the display to expose a portion of the display area externally; and a controller configured to control the communication module, the display, and the motor, wherein the controller is configured to:

control the display to output first content on a first partial view based on that a state of the display is the first partial view;

change the state of the display to a second partial view based on receiving an event occurrence;

control the display to output second content on the second partial view, and wherein the second partial view has a larger display area exposed externally than the first partial view, establish a connection with an external terminal through the communication module; and change the state of the display to one of the first partial view or the second partial view based on information received from the external terminal.

2. The display device of claim 1, wherein the first content is an icon list including at least one icon, wherein the event occurrence is a control signal for selecting a first icon from the icon list, and wherein the second content is a detailed menu for the first icon.

3. The display device of claim 2, wherein based on receiving a control signal for the detailed menu, the controller is configured to change the state of the display to a full view and output content for the detailed menu on the full view.

4. The display device of claim 1, wherein the first content is a text search screen, wherein the event occurrence is a control signal for selecting a search icon, and wherein the second content is a list of search results.

5. The display device of claim 4, wherein based on receiving a control signal for selecting a first search result from the list of search results, the controller is configured to change the state of the display to a full view and output content for the first search result on the full view.

6. The display device of claim 1, wherein based on receiving an additional event occurrence, the controller is configured to change the state of the display to a third partial view and control the display to output content related to the additional event occurrence on the third partial view, and wherein the third partial view has a larger display area exposed externally than the second partial view.

7. A display device comprising:

a communication module configured to communicate externally;

a display having a display area for outputting content;

a motor configured to control the display to expose a portion of the display area externally; and a controller configured to:

control the communication module, the display, and the motor, wherein the controller is configured to:

control the display to output first content on a first partial view based on that a state of the display is the first partial view;

change the state of the display to a second partial view based on receiving an event occurrence; and control the display to output second content on the second partial view, and wherein the second partial view has a larger display area exposed externally than the first partial view, wherein the first content is default content, and wherein the event occurrence is an emergency alarm.

8. The display device of claim 1, wherein the controller is configured to change the state of the display to a full view, wherein the full view is a state in which the display area is maximally exposed externally, and wherein based on that the state of the display is the full view, the controller is configured to output additional information in a predetermined area.

9. The display device of claim 8, wherein the controller is configured to determine the predetermined area in which the additional information is output based on content being output on the full view.

10. The display device of claim 1, wherein based on that the information received from the external terminal includes an image or video, the controller is configured to:

change the state of the display to the second partial view; and output a thumbnail for the image or video on the second partial view.

11. The display device of claim 10, wherein based on receiving a control signal for the thumbnail, the controller is configured to:

change the state of the display to a full view; and output entire content for the thumbnail on the full view.

12. The display device of claim 1, wherein the controller is configured to:

receive information on a screen of the external terminal; and control the display to expose a portion of the display area externally based on the received screen information.

13. The display device of claim 12, wherein the controller is configured to:

receive content being output by the external terminal; and output the received content in the portion of the display area through mirroring.

14. A method of controlling a display device configured to change a size of a display area exposed externally, the method comprising:

outputting first content on a first partial view based on that a state of a display is the first partial view;

changing the state of the display to a second partial view based on receiving an event occurrence;

outputting second content on the second partial view, wherein the second partial view has a larger display area exposed externally than the first partial view, establishing a connection with an external terminal through a communication module; and changing the state of the display to one of the first partial view or the second partial view based on information received from the external terminal.

* * * * *